United States Patent
Cao et al.

(10) Patent No.: US 12,192,469 B2
(45) Date of Patent: Jan. 7, 2025

(54) DERIVED INTRA PREDICTION MODES AND MOST PROBABLE MODES IN VIDEO CODING

(71) Applicant: QUALCOMM Incorporated, San Diego, CA (US)

(72) Inventors: Keming Cao, San Diego, CA (US); Nan Hu, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/804,972

(22) Filed: Jun. 1, 2022

(65) Prior Publication Data
US 2022/0394269 A1 Dec. 8, 2022

Related U.S. Application Data

(60) Provisional application No. 63/217,158, filed on Jun. 30, 2021, provisional application No. 63/196,580, filed on Jun. 3, 2021.

(51) Int. Cl.
 *H04N 11/02* (2006.01)
 *H04N 19/105* (2014.01)
 (Continued)

(52) U.S. Cl.
 CPC ......... *H04N 19/132* (2014.11); *H04N 19/105* (2014.11); *H04N 19/146* (2014.11); *H04N 19/159* (2014.11); *H04N 19/176* (2014.11)

(58) Field of Classification Search
 CPC .. H04N 19/132; H04N 19/105; H04N 19/146; H04N 19/159; H04N 19/176
 (Continued)

(56) References Cited

U.S. PATENT DOCUMENTS 10,368,107 B2   7/2019  Zhang et al.
11,388,421 B1 *  7/2022  Wang ..................... H04N 19/11
(Continued)

OTHER PUBLICATIONS

Abdoli (ATEME) M., et al., "Non-CE3: Decoder-Side Intra Mode Derivation with Prediction Fusion", 14. JVET Meeting, Mar. 19, 2019-Mar. 27, 2019, Geneva, (The Joint Video Exploration Team of ISO/IEC JTC1/SC29/WG11 and Itu-T SG.16), No. JVET-N0342, Mar. 18, 2019 (Mar. 18, 2019), XP030203490, 6 Pages.
(Continued)

*Primary Examiner* — Jayanti K Patel
*Assistant Examiner* — Richard B Carter
(74) *Attorney, Agent, or Firm* — Shumaker & Sieffert, PA

(57) ABSTRACT

A method of encoding or decoding video data comprises: for each respective intra prediction mode of a plurality of intra prediction modes in a most-probable mode (MPM) list: generating, based on reference samples for a template region and using the respective intra prediction mode, prediction samples for the template region; and determining a cost for the respective intra prediction mode; determining a first intra prediction mode and a second intra prediction mode in the MPM list having lowest costs; determining a preliminary prediction block for the first intra prediction mode and a preliminary prediction block for the second intra prediction mode; generating a prediction block based on a fusion of the preliminary prediction blocks weighted according to a weight for the first intra prediction mode and a weight for the second intra prediction mode.

16 Claims, 11 Drawing Sheets

(51) Int. Cl.
  *H04N 19/132* (2014.01)
  *H04N 19/146* (2014.01)
  *H04N 19/159* (2014.01)
  *H04N 19/176* (2014.01)
(58) Field of Classification Search
  USPC .................................................. 375/240.02
  See application file for complete search history.

(56) References Cited

U.S. PATENT DOCUMENTS

| | | | | |
|---|---|---|---|---|
| 2019/0166370 | A1* | 5/2019 | Xiu | H04N 19/11 |
| 2020/0296356 | A1* | 9/2020 | Mora | G06N 7/01 |
| 2020/0404302 | A1* | 12/2020 | Heo | H04N 19/46 |
| 2022/0021874 | A1* | 1/2022 | Fang | H04N 19/159 |
| 2022/0224922 | A1* | 7/2022 | Wang | H04N 19/147 |
| 2022/0345692 | A1* | 10/2022 | Li | H04N 19/132 |

OTHER PUBLICATIONS

Cao (QUALCOMM) K., et al., "EE2-Related: Fusion for Template-Based Intra Mode Derivation", JVET-W0123-V2, Joint Video Experts Team of ITU-T SG 16 WP 3 and ISO/IEC JTC 1/SC 29, 23rd JVET Meeting, by Teleconference, Jul. 7, 2021-Jul. 16, 2021, (The Joint Video Exploration Team of ISO/IEC TC1/SC29/WG11 and ITU-T SG.16), No. JVET-W0123, m57240, Jul. 7, 2021, XP030296125, 4 Pages.

Chang Y-J., et al., "Compression Efficiency Methods Beyond VVC", 21. JVET Meeting, Joint Video Experts Team of ITU-T SG 16 WP 3 and ISO/IEC JTC 1/SC 29, JVET-U0100, 133. MPEG 21st Meeting, by teleconference, Jan. 6-15, 2021, (The Joint Video Exploration Team of ISO/IEC JTC1/SC29/WG11 and ITU-T SG.16), No. JVET-U0100, Dec. 31, 2020, XP030293237, Jan. 11, 2021-Jan. 15, 2021, Online, (MPEG or ISO/IEC JTC1/SC29/WG11), No. m55890, XP030290689, pp. 1-13.

Chang Y-J., et al., (QUALCOMM): "EE2: Tests of Compression Efficiency Methods Beyond VVC", 22. JVET Meeting, Apr. 20, 2021-Apr. 28, 2021, Teleconference, (The Joint Video Exploration Team of ISO/IEC JTC1/SC29/WG11 and ITU-T SG.16 WP 3), No. JVET-V0120-V2, m56535, Apr. 22, 2021, pp. 1-31, XP030294307.

International Search Report and Written Opinion—PCT/US2022/072723—ISA/EPO—Sep. 2, 2022.

Itu-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Itu-T H.266: "Series H: Audiovisual and Multimedia Systems Infrastructure of Audiovisual Services—Coding of Moving Video", Versatile Video Coding, The International Telecommunication Union, Aug. 2020, 516 pages.

Mohsen A., et al., "Decoder-Side Intra Mode Derivation For Next Generation Video Coding", 2020 IEEE International Conference on Multimedia And Expo (ICME), IEEE, Jul. 6, 2020 (Jul. 6, 2020), pp. 1-6, XP033808189, DOI: 10.1109/ICME46284.2020.9102799, [Retrieved on May 27, 2020].

Seregin V., et al., "Exploration Experiment on Enhanced Compression Beyond VVC capability (EE2)", JVET-V2024-v3, Joint Video Experts Team (JVET) of ITU-T SG 16 WP 3 and ISO/IEC JTC 1/SC 29, 22nd Meeting, by teleconference, Apr. 20-28, 2021, pp. 1-7.

Wang (BYTEDANCE) Y., et al., "EE2-Related: Template-Based Intra Mode Derivation using MPMs", 22. JVET Meeting, Apr. 20, 2021-Apr. 28, 2021, Teleconference, (The Joint Video Exploration Team of ISO/IEC JTC1/SC29/WG11 and ITU-TSG.16), No. JVET-V0098-V2, M56510, Apr. 22, 2021 (Apr. 22, 2021), XP030294223, 4 Pages.

Xiu (INTERDIGITAL) X., et al., "EE8: Decoder-Side Intra Mode Derivation", 4. JVET Meeting, Oct. 15, 2016-Oct. 21, 2016, Chengdu (The Joint Video Exploration Team of ISO/IEC JTC1/SC29/WG11 and ITU-T SG.16), No. JVET-D0097, Oct. 15, 2016 (Oct. 15, 2016), XP030247351, 7 Pages.

\* cited by examiner

DERIVED INTRA PREDICTION MODES AND MOST PROBABLE MODES IN VIDEO CODING

This application claims the benefit of U.S. Provisional Patent Application 63/196,580, filed Jun. 3, 2021, and U.S. Provisional Patent Application 63/217,158, filed Jun. 30, 2021, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques that may improve coding efficiency and performance of intra prediction in a video coding specification, such as in an enhanced compression model (ECM) beyond Versatile Video Coding (VVC). The techniques of this disclosure may be applied in ECM or another video codec. As described herein, a video encoder (e.g., a video encoder or a video decoder) may encode or decode video data using a modified form of template-based intra mode derivation (TIMD). In this modified form of TIMD, the video coder may generate a prediction block based on a fusion of preliminary prediction blocks for a first intra prediction mode and a second intra prediction mode.

In one example, a method of encoding or decoding video data, the method comprising: for each respective intra prediction mode of a plurality of intra prediction modes in a most-probable mode (MPM) list: generating, based on reference samples for a template region and using the respective intra prediction mode, prediction samples for the template region, wherein the template region is above or left of a block of the video data; and determining a cost for the respective intra prediction mode based on differences between (1) the prediction samples for the template region and (2) reconstructed samples for the template region; determining a first intra prediction mode and a second intra prediction mode, wherein the first intra prediction mode and the second intra prediction mode are intra prediction modes in the MPM list having lowest costs; determining a weight for the first intra prediction mode and a weight for the second intra prediction mode; determining a preliminary prediction block for the first intra prediction mode and a preliminary prediction block for the second intra prediction mode; generating a prediction block based on a fusion of the preliminary prediction block for the first intra prediction mode and the preliminary prediction block for the second intra prediction mode weighted according to the weight for the first intra prediction mode and the weight for the second intra prediction mode; and one of reconstructing the block based on the prediction block, or encoding the block based on the prediction block.

In another example, this disclosure describes a device for encoding or decoding video data, the device comprising: a memory to store the video data; and one or more processors implemented in circuitry, the one or more processors configured to: for each respective intra prediction mode of a plurality of intra prediction modes in a most-probable mode (MPM) list: generate, based on reference samples for a template region and using the respective intra prediction mode, prediction samples for the template region, wherein the template region is above or left of a block of the video data; and determine a cost for the respective intra prediction mode based on differences between (1) the prediction samples for the template region and (2) reconstructed samples for the template region; determine a first intra prediction mode and a second intra prediction mode, wherein the first intra prediction mode and the second intra prediction mode are intra prediction modes in the MPM list having lowest costs; determine a weight for the first intra prediction mode and a weight for the second intra prediction mode; determining a preliminary prediction block for the first intra prediction mode and a preliminary prediction block for the second intra prediction mode; generate a prediction block based on a fusion of the preliminary prediction block for the first intra prediction mode and the preliminary prediction block for the second intra prediction mode weighted according to the weight for the first intra prediction mode and the weight for the second intra prediction mode; and reconstruct the block based on the prediction block, or encode the block based on the prediction block.

In another example, this disclosure describes a device for encoding or decoding video data, the device comprising: for each respective intra prediction mode of a plurality of intra prediction modes in a most-probable mode (MPM) list: means for generating, based on reference samples for a template region and using the respective intra prediction mode, prediction samples for the template region, wherein the template region is above or left of a block of the video data; and means for determining a cost for the respective intra prediction mode based on differences between (1) the prediction samples for the template region and (2) reconstructed samples for the template region; means for determining a first intra prediction mode and a second intra prediction mode, wherein the first intra prediction mode and the second intra prediction mode are intra prediction modes in the MPM list having lowest costs; means for determining a weight for the first intra prediction mode and a weight for the second intra prediction mode; means for determining a preliminary prediction block for the first intra prediction mode and a preliminary prediction block for the second intra prediction mode; means for generating a prediction block based on a fusion of the preliminary prediction block for the first intra prediction mode and the preliminary prediction block for the second intra prediction mode weighted according to the weight for the first intra prediction mode and the weight for the second intra prediction mode; and means for reconstructing the block based on the prediction block or means for encoding the block based on the prediction block.

In another example, this disclosure describes a non-transitory computer-readable storage medium having stored thereon instructions that, when executed, cause one or more processors to: for each respective intra prediction mode of a plurality of intra prediction modes in a most-probable mode (MPM) list: generate, based on reference samples for a template region and using the respective intra prediction mode, prediction samples for the template region, wherein the template region is above or left of a block of video data; and determine a cost for the respective intra prediction mode based on differences between (1) the prediction samples for the template region and (2) reconstructed samples for the template region; determine a first intra prediction mode and a second intra prediction mode, wherein the first intra prediction mode and the second intra prediction mode are intra prediction modes in the MPM list having lowest costs; determine a weight for the first intra prediction mode and a weight for the second intra prediction mode; determine a preliminary prediction block for the first intra prediction mode and a preliminary prediction block for the second intra prediction mode; generate a prediction block based on a fusion of the preliminary prediction block for the first intra prediction mode and the preliminary prediction block for the second intra prediction mode weighted according to the weight for the first intra prediction mode and the weight for the second intra prediction mode; and reconstruct the block based on the prediction block or encode the block based on the prediction block.

The details of one or more examples are set forth in the accompanying drawings and the description below. Other features, objects, and advantages will be apparent from the description, drawings, and claims.

DETAILED DESCRIPTION

Figure 1:
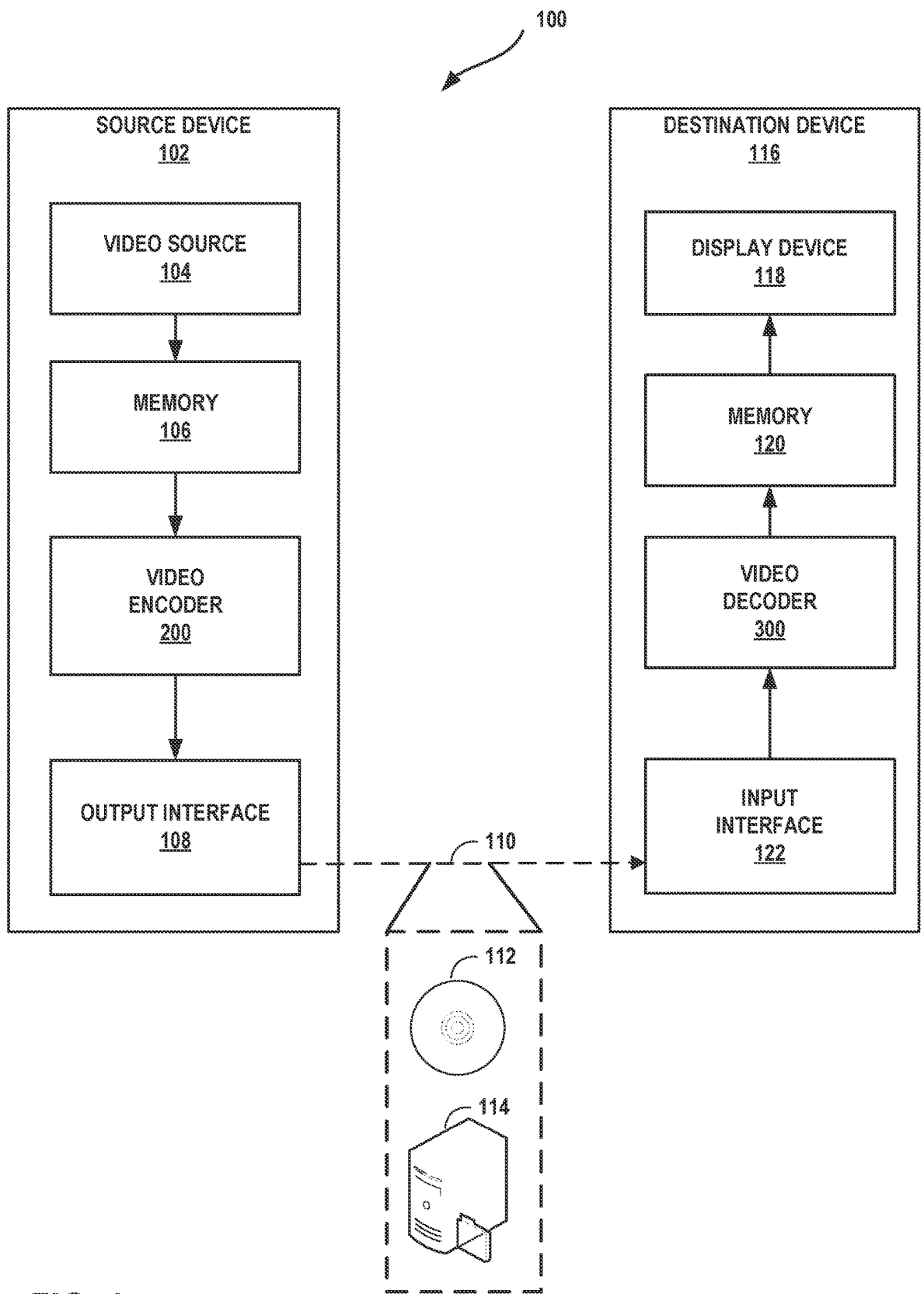
FIG. 1 is a block diagram illustrating an example video encoding and decoding system that may perform the techniques of this disclosure.

Template-based intra mode derivation (TIMD) is a video coding tool that may be used to improve coding efficiency in certain situations. When a video encoder uses TIMD, the video encoder may generate a most-probable mode (MPM) list for a current coding unit (CU). The MPM list for the current CU includes two or more intra prediction modes. This disclosure may use the terms "intra prediction mode" and "intra mode" interchangeably. For each respective intra prediction mode in the MPM list for the current CU, the video encoder may generate, based on reference samples for one or more template regions, prediction samples for the one or more template regions using the respective intra prediction mode. The template regions may be above or left of the current CU. The video encoder may determine a cost for the respective intra prediction mode based on a sum of absolute total differences (SATD) between (1) the prediction samples for the template regions and (2) reconstructed samples for the template regions. Furthermore, when using TIMD, the video encoder may then choose the intra prediction mode with the lowest cost. The video encoder may then use the lowest-cost intra prediction mode to generate a prediction block for the current CU. The video encoder may encode the current CU based on the prediction block for the current CU. A video decoder may perform the same process when using TIMD, except the video decoder may reconstruct the current CU based on the prediction block. The TIMD process may enhance coding efficiency relative to previous ways of performing intra prediction because the video encoder may avoid the need to signal one or more syntax elements indicating which intra prediction mode to use to generate the prediction block for the current CU.

This disclosure describes techniques that may further enhance the efficiency of TIMD. As described herein, the video encoder may perform a process similar to that described above, except the video encoder determines a first intra prediction mode and a second intra prediction mode, where the first intra prediction mode and the second intra prediction mode are intra prediction modes in the MPM list having lowest costs. The video encoder may also determine weights for the first intra prediction mode and the second intra prediction mode. Furthermore, the video encoder may determine preliminary prediction blocks for the first intra prediction mode and the second intra prediction mode. The video encoder may then generate a prediction block for the current CU based on a fusion of the preliminary prediction blocks weighted according to the weights for the first intra prediction mode and the second intra prediction mode. The video encoder may then encode the current CU based on the prediction block of the current CU. A video decoder configured in accordance with the techniques of this disclosure may perform a similar process, except the video decoder may reconstruct the current CU based on the prediction block. By fusing the preliminary prediction blocks to generate the prediction block for the current CU, as described in this disclosure, coding efficiency may be enhanced because the prediction block for the current CU may be more similar to the current CU itself than a prediction block generated for the current CU using the conventional TIMD process.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116. Source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for intra prediction in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for intra prediction in video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). The techniques of this disclosure, however, are not limited to any particular coding standard or specification.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sampleby-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Figure 2A:
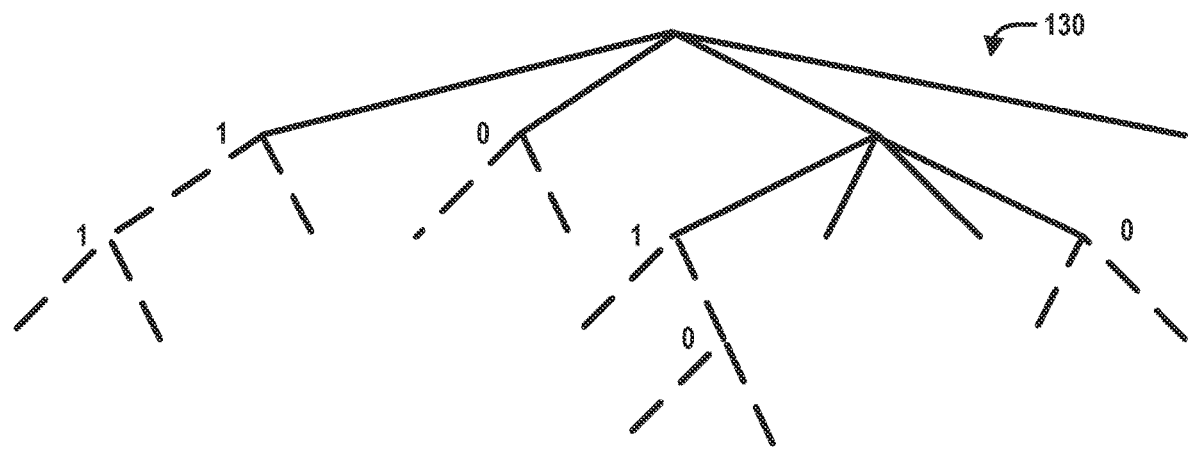
FIGS. 2A and 2B are conceptual diagrams illustrating an example quadtree binary tree (QTBT) structure, and a corresponding coding tree unit (CTU).
Figure 2B:
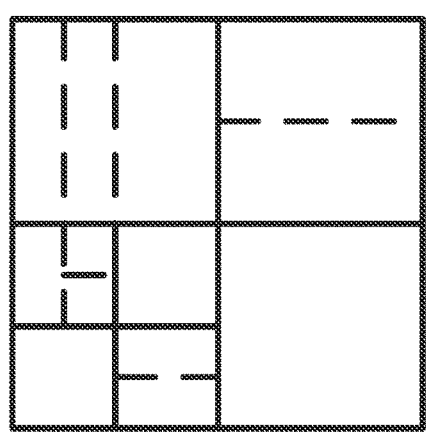

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Besides the normal intra prediction modes, such as planar mode, DC mode and angular intra prediction modes, the intra prediction modes available to video encoder 200 and video decoder 300 may include another mode called decoder-side intra mode derivation (DIMD). DIMD aims to derive the coding mode at the decoder side.

The DIMD coding mode is derived with the help of a Histogram of Gradient (HoG). The HoG may be a vector of some predetermined length (e.g., 67). Each element in the HoG corresponds to a different direction and denotes a magnitude of the corresponding direction. For a current CU, the HoG is computed with reconstructed samples from the above reconstructed neighbor, left reconstructed neighbor and top-left corner neighbor. More specifically, to determine a magnitude of a direction, a video coder (e.g., video encoder 200 or video decoder 300) may analyze a series of overlapping windows (e.g., 3×3 windows) of the neighbor samples of a current CU. When analyzing a window, the video coder may determine which intra prediction mode best characterizes the samples in the window. The video coder may then increment the element in the HoG corresponding to the determined intra prediction mode. In effect, the HoG creates a cue for possible angular intra prediction modes.

The first two angular intra prediction modes from HoG with the two highest magnitudes are fused with planar mode as the final prediction from DIMD. In other words, a video coder may generate a prediction block for a current block (e.g., a current CU) by fusing a preliminary prediction block generated using the planar mode, a preliminary prediction block generated using the angular intra prediction mode with the highest magnitude in the HoG, and a preliminary prediction block generated using the angular intra prediction modes with the second highest magnitude in the HoG.

The video coder may apply weights to the preliminary prediction blocks when fusing the preliminary prediction blocks to generate the prediction block for the current block. In some examples, the video coder determines the weights based on magnitudes in the HoG. For instance, let mode1 denote the angular intra prediction mode having the highest magnitude in the HoG, let mode2 denote the angular intra prediction mode having the second-highest magnitude in the HoG, and let mag1 and mag2 denote the magnitudes of mode1 and mode2. The weights of fusion for mode1, mode2 and planar mode correspondingly may be $$\frac{2mag1}{3(mag1+mag2)}, \frac{2mag2}{3(mag1+mag2)},$$

and ⅓.

In intra prediction, video encoder 200 and video decoder 300 may generate a list of most probable modes (MPMs) for each PU. When video encoder 200 encodes an intra prediction mode, instead of directly writing a mode into the bitstream, video encoder 200 encodes an index into the MPM list of an actual chosen intra prediction mode. The use of an MPM list may reduce the number of bits involved in signaling indexes of chosen intra prediction modes. In some examples, the MPM list is of length 22 and may include or consist of two parts. The first 6 intra prediction modes in the MPM list are called primary MPMs. The primary MPMs are planar intra prediction mode, an intra prediction mode from a left PU, an intra prediction mode from an above PU, an intra prediction mode from a below-left PU, an intra prediction mode from an above-right PU and an intra prediction mode from an above-left PU. The next 16 intra prediction modes in the MPM list are called the secondary MPM list. The secondary MPM list includes or consists of intra prediction modes derived by offsets from the intra prediction modes in the primary MPM list. DIMD modes mode1 and mode2 may be added after the primary MPM and before the secondary MPMs in the final MPM list.

All other intra prediction modes that are not included into the MPM list are included in a list named the non-MPM list. Video encoder 200 and video decoder 300 may also generate a separate MPM list for a chroma channel (i.e., a chroma MPM list), where the first 4 intra prediction modes of the chroma MPM list correspond to the intra prediction modes in the luma MPM list.

Figure 3:
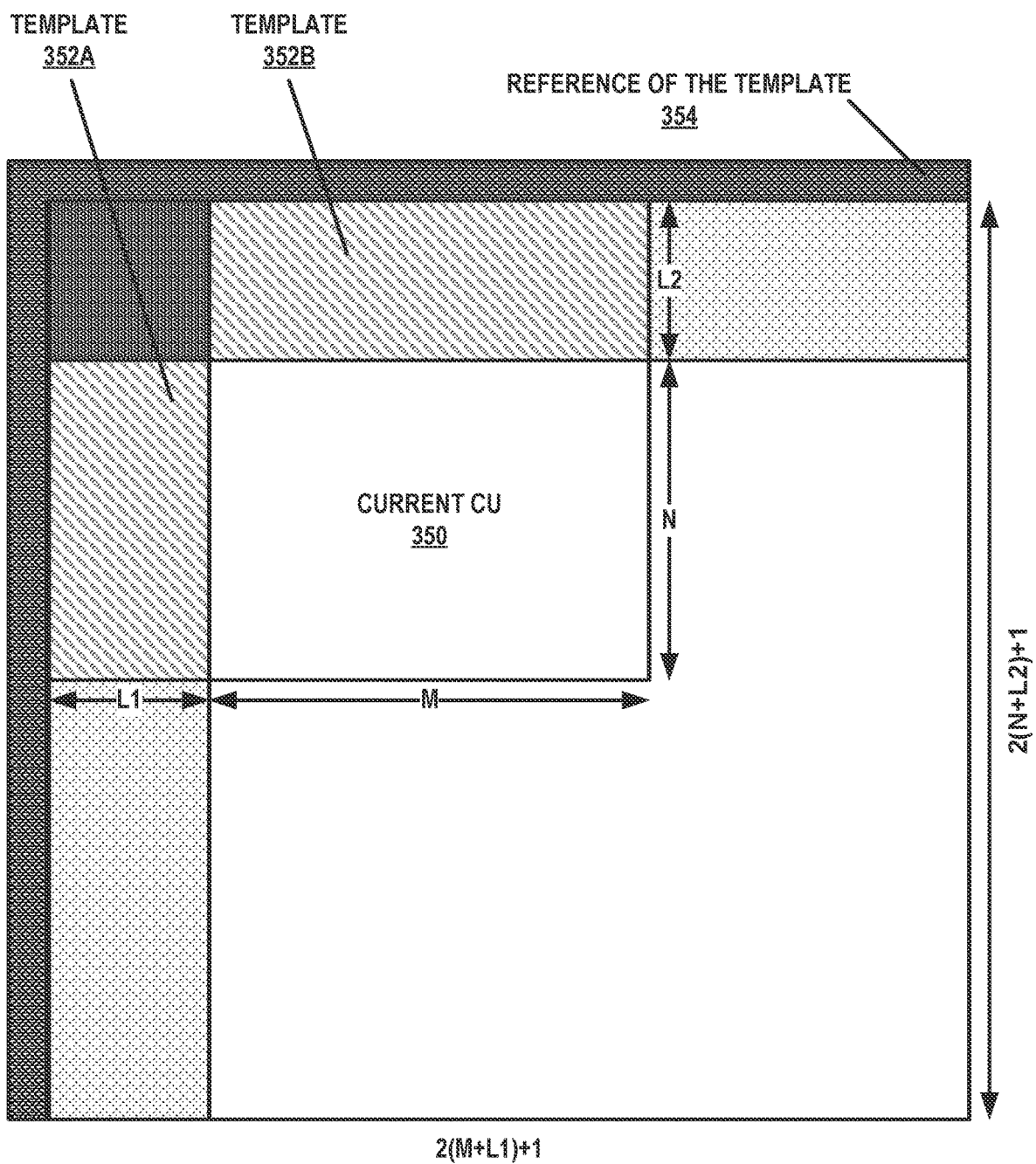
FIG. 3 is a conceptual diagram illustrating a template and reference samples used in template-based intra mode derivation.

Another proposed decoder-side intra mode derivation process is template-based intra mode derivation (TIMD). The idea for TIMD is shown in FIG. 3. FIG. 3 is a conceptual diagram illustrating a template and reference samples used in TIMD. Given a current CU 350, a video coder (e.g., video encoder 200 or video decoder 300) chooses two template regions 352A, 352B (collectively, "template regions 352"). Template regions 352 are above current CU 350 and left of current CU 350. Additionally, the video coder chooses a reference 354 of template regions 352. Reference 354 may comprise reconstructed samples left and above of template regions 352.

For each intra prediction mode in a MPM list for current CU 350, the video coder generates a prediction for template regions 352. In other words, for each of template regions 352, the video coder may, for each intra prediction mode in the MPM list for current CU 350, use the intra prediction mode to generate a prediction block for template region. Furthermore, the video coder may compute a Sum of Absolute Transformed Differences (SATD) cost on the template region between the prediction and reconstruction samples of the template region. The video coder may then choose the intra prediction mode that with the lowest cost as the intra prediction mode for TIMD.

There are several issues with the implementations of DIMD and TIMD described above. A first issue lies in DIMD. The intra prediction mode from the HoG might not be accurate enough to predict the intra prediction mode. In other words, the intra prediction modes corresponding to the entry in the HoG with the highest and second-highest magnitudes might not be the best intra prediction mode for the current block. The fusion of intra prediction modes can lead to better performance, but the number of intra prediction modes to be fused and which intra prediction modes to fuse can be optimized. A second issue is in the existing MPM construction method because the order of MPMs might not be optimal. A third issue is that coding efficiency of the current TIMD process may be improved.

This disclosure describes several examples that may address the aforementioned issues. The examples described below can be used solely or in any combination. This disclosure introduces the term "derived modes." The derived modes are intra prediction modes that are derived at encoder and decoder sides, e.g., by video encoder 200 and video decoder 300. The derived modes may optionally include non-angular modes such as planar or DC modes. A derived mode direction (i.e., a direction of a derived mode) is not explicitly signaled because video decoder 300 derives the mode direction. Accordingly, the derived direction can provide more variety in the intra prediction because the derived direction does not have to be one of the existing intra directions used in the conventional intra prediction. For example, there can be more derived intra directions, e.g., the angles may be twice as dense.

There can be many techniques to derive intra prediction modes, and in this disclosure several examples are provided of how to derive the intra prediction modes, but some techniques are not constrained to how derivation is performed, and such techniques may be applied with any derivation method. In one example, the mode derivation may use a DIMD process (gradient based derivation) process or a TIMD (template-based derivation) process.

In accordance with the techniques of this disclosure related to DIMD, the number of modes to be fused in the DIMD prediction can be flexible. For instance, in some examples, video encoder 200 and video decoder 300 may choose only one intra prediction mode from DIMD without fusion. For example, video encoder 200 and video decoder 300 may have choose the intra prediction mode having the largest magnitude in the HoG and use the chosen intra prediction mode to generate a prediction block. In some examples, video encoder 200 and video decoder 300 may fuse more than three intra prediction modes. Fusion of intra prediction modes refers to generating a prediction block based on prediction blocks generated using the intra prediction modes. In some examples, video encoder 200 and video decoder 300 do not fuse intra prediction modes when the normalized largest magnitude of the HoG is greater than a threshold (e.g., 0.7 or another value).

In some examples, intra prediction modes to be fused are not constrained to be the intra prediction modes from DIMD. For instance, in some examples, a derived mode, e.g., the first intra prediction mode from DIMD, and intra prediction modes from neighbor CUs are fused. In some examples, the intra prediction modes directly from the MPM list are fused or fused with planar mode.

Modes derived at decoder side, e.g., DIMD modes, can be further optimized by considering templates 352 and the samples of reference 354 of templates 352, e.g., shown in FIG. 3. In one example, the process can be as follows:

1. First, a template region is set to be a neighbor region of a current CU. The template region may include either or both of templates 352A, 352B, and/or the region above and left of templates 352A, 352B of FIG. 3. Reference of samples is also generated with regards to the template region. In other words, video encoder 200 or video decoder 300 may reconstruct samples in the template region.
2. Then, based on the already derived mode (for example, using the existing DIMD process), a candidate list of intra prediction modes is generated. The candidate list contains one or more adjacent modes to the derived mode. An adjacent mode is defined as an intra prediction mode corresponding to an angle (i.e., direction) from a neighborhood of the angles (i.e., directions) around the angle of the derived mode. For example, the adjacent direction (i.e., the direction of the adjacent mode) may be derived by adding + or −1, + or −2, and/or other offsets to the derived mode angle.
3. The prediction samples of the template region are computed for each mode in the candidate list.
4. A cost between the prediction samples and the reconstructed samples of the template region are computed for each mode in the candidate list.
5. The mode with the least cost is chosen as the updated mode. The cost may be determined according to any function, such as Sum of Squared Estimate of Errors (SSE), Sum of Absolute Differences (SAD), SATD, etc.

In a first example implementation, mode1, mode2 and mode3 may denote the first three intra prediction modes from DIMD with normalized magnitudes mag1 and mag2, mag3. A video coder (e.g., video encoder 200 or video decoder 300) may fuse mode1, mode2 and mode3 with planar mode with weights as $$\frac{3mag1}{4(mag1+mag2+mag3)},$$

$$\frac{3mag2}{4(mag1+mag2+mag3)}, \frac{3mag3}{4(mag1+mag2+mag3)},$$

and ¼. In other words, for each sample of a prediction block of a current block (e.g., a current CU), the video coder may calculate a weighted average of the samples of preliminary prediction blocks generated using mode1, mode2, and mode3, and the planar mode.

Figure 4:
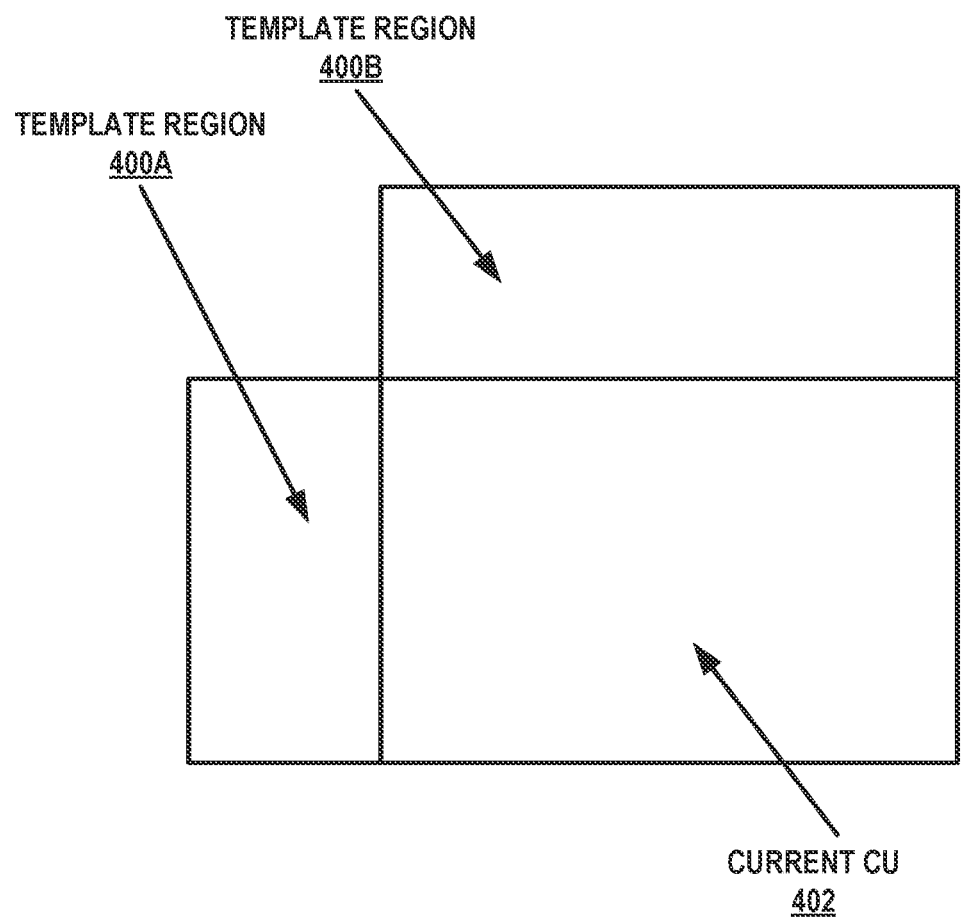
FIG. 4 is a conceptual diagram illustrating a template for a current coding unit.

In a second example implementation, given mode1 from DIMD, a video coder (e.g., video encoder 200 or video decoder 300) may generate a candidate list of length 7 as {mode1-3, mode1-2, mode1-1, mode1, mode1+1, mode1+2, mode1+3}. For each intra prediction mode in the candidate list, the video coder may compute prediction samples of template regions 400A, 400B (collectively, "template regions 400") in FIG. 4 are computed. FIG. 4 is a conceptual diagram illustrating a template for a current CU 402. In one example, the video coder computes a SATD cost between the prediction samples and the reconstructed samples of template regions 400. The video coder chooses the intra prediction mode from the candidate list with the lowest cost as the final mode1.

The video coder may apply a similar method to mode2, which may be the second mode from DIMD. The video coder may then perform a fusion between mode1, mode2, and optionally planar mode as in the original DIMD. In other words, the video coder may fuse the preliminary prediction blocks generated using mode1, mode2, and optionally the planar mode. Fusion may refer to the combination of prediction blocks generated using different modes to generate a final prediction block.

As mentioned above, this disclosure describes techniques that may improve the process of generating the MPM list. In accordance with one or more techniques of this disclosure, the order of modes in the MPM list can be changed based on the different criteria. These criteria may be derived on both encoder and decoder sides. In other words, both video encoder 200 and video decoder 300 may derive the criteria.

In one example, a video coder (e.g., video encoder 200 or video decoder 300) may sort the order of intra prediction modes in the MPM list based on a neighbor template cost. The neighbor template cost may be a cost (e.g., a SATD) based on a difference between the reconstructed samples of the template and predicted samples of the template generated using an intra prediction mode. The video coder may apply this sorting process to all intra prediction modes in the MPM list or to a certain subset of the intra prediction modes in the MPM list. For example, the video coder may exclude non-angular modes, such as planar mode, from the sorting process. In some examples, the sorting process may include the following steps:
a. Reference samples are generated for the neighbor template
b. Intra prediction for each mode in the MPM list is derived for the neighbor template (left and/or above templates shown on FIG. 4) using the generated reference samples
c. A cost between the prediction and the reconstruction of the neighbor template is computed
   i. Cost can be any metric, such as Sum of Squared Errors (SSE), Sum of Absolute Differences (SAD), SATD, etc.
d. MPM list is sorted by the cost, for example in the ascending order.
e. Planar mode, or non-angular modes, may be always placed as the first mode(s) in the MPM list and can be excluded from the sorting process.

Thus, in some examples, the video coder may, for each respective intra prediction mode of a plurality of non-planar intra prediction modes in a MPM list, generate prediction samples of template regions using the respective intra prediction mode, wherein the template regions are above and left of a block of the video data. Furthermore, for each respective intra prediction mode in the MPM list, the video coder may compute a cost for the respective intra prediction mode based on differences between (1) the prediction samples of the template regions generated using the respective intra prediction mode and (2) reconstructed samples of the template regions. The video coder may sort the plurality of non-planar intra prediction modes in the MPM list based on the costs for the non-planar intra prediction modes, determine a selected intra prediction mode in the MPM list, and generate a prediction block using the selected intra prediction mode. The video coder may reconstruct the block based on the prediction block, or encode the block based on the prediction block.

In some examples, the video coder sorts the primary MPMs and the secondary MPMs separately. In another example, the video coder sorts only primary MPMs, but not secondary MPMs. In another example, the video coder sorts only non-derived modes, which are taken from the neighboring blocks, but the video coder does not sort derived MPMs and modes derived based on the neighboring modes. In some examples, the video coder only sorts the first N MPMs, where N can be a number greater than 0. In some examples, N is set equal to 4. In some examples, the video coder sorts the intra prediction modes in the non-MPM list. In some examples, the video coder sorts the chroma modes in the chroma MPM list. In some examples, the position of the derived modes (for example, DIMD modes) in the MPM list may depend on whether there are neighbor CUs using the derived modes in the prediction.

In some examples, the derived modes (e.g., DIMD and/or TIMD or similar modes) can be added to the MPM list together with the intra prediction modes from the neighboring blocks. The motivation is that the derived modes are derived from the neighboring samples and can be considered as alternative directions of the neighboring intra directions.

For example, the derived modes may be added after all neighbor intra prediction modes into the MPM list. When the MPM list is incomplete (e.g., the MPM list has less than a predetermined number of modes), to fill up the MPM list, the intra prediction modes may be generated by adding offsets, for example +−1, +−2 and so on, to already added modes to the MPM list. In such case, the offsets may be also applied to the derived modes, which are added with the neighboring intra prediction modes, and such offset modes may be added to the MPM list.

In some examples, given a non-planar mode from the MPM list, a video coder (e.g., video encoder 200 or video decoder 300) may compute the prediction samples of template regions 400 in FIG. 4. In one example, the video coder computes a SATD cost between the prediction samples and the reconstructed samples of the templates. The video coder may sort intra prediction modes in the MPM list based on the cost from the smallest to the largest excluding planar mode, which the video coder may always add as the first mode in the MPM list.

Thus, in some examples, the video coder may generate a most-probable mode (MPM) list that includes a plurality of intra prediction modes, wherein the plurality of intra prediction modes includes a plurality of non-planar intra prediction modes. For each respective intra prediction mode of the plurality of non-planar intra prediction modes in the MPM list, the video coder may generate prediction samples of template regions using the respective intra prediction mode. The template regions are above and left of a block of the video data. The video coder may compute a cost for the respective intra prediction mode based on differences between (1) the prediction samples of the template regions generated using the respective intra prediction mode and (2) reconstructed samples of the template regions. The video coder may sort the intra prediction modes in the MPM list based on the cost for the intra prediction modes. Additionally, the video coder may determine a selected intra prediction mode in the MPM list and generate a prediction block using the selected intra prediction mode. The video coder may reconstruct the block based on the prediction block, or encode the block based on the prediction block. In some examples, the video coder may sort primary MPMs in the MPM list and not secondary MPMs in the MPM list. In some examples, the video coder may sort non-derived intra prediction modes in the MPM list and not derived intra prediction modes. In some examples, the video coder may sort a first N intra prediction modes in the MPM list and not a second M intra prediction modes in the MPM list, wherein N and M are non-zero numbers.

In some examples, the video coder conditionally adjusts the position of DIMD mode in the MPM list. In one example, if at least one of the five neighbors (above, left, above-right, below-left, above-left) of the current CU is coded with DIMD mode, the video coder may add the first DIMD mode of the current CU (i.e., the intra prediction mode having a highest magnitude in the HoG) as the second mode (the mode after planar mode) in the MPM list. In another example, the video coder may put the first and second DIMD modes (i.e., the intra prediction modes having the highest and second highest magnitudes in the HoG) after the planar mode in the MPM list if at least one of the five neighbors of the current CU is coded with DIMD mode. In another example, the video coder may calculate the number of neighbor blocks using DIMD prediction, and based on a comparison of this number against a threshold, the video coder may determine whether derived modes (e.g., derived in DIMD process) are added after planar mode in the MPM list or the derived modes are added to the primary or secondary MPM list.

As mentioned above, this disclosure also describes techniques that may improve the TIMD process. In accordance with one or more techniques of this disclosure, a video coder (e.g., video encoder 200 or video decoder 300) may fuse multiple intra prediction modes derived using the TIMD process. In some examples, the video coder may fuse intra prediction modes with the planar mode. In some examples, the video coder only fuses intra prediction modes derived by applying TIMD process. The video coder may derive weighting factors in the fusion process based on the costs of the intra prediction modes. The video coder may use a conversion equation to convert the costs of the intra prediction modes to weighting factor (i.e., weights). The conversion equation between the cost and the weighting factors could be of any type with two conditions satisfied. For example, the higher the costs, the lower the weight is. The sum of total weights should be 1.

In some examples, the video coder may apply one or more criteria to determine whether or not to fuse intra prediction modes. The criteria may be related to, but not constrained to, the TIMD cost. For example, if the cost for the first intra prediction mode is lower than the cost of the second intra prediction mode by a threshold, the video coder may directly take the first intra prediction mode without fusion. Otherwise, the video coder may fuse the first mode and the second mode. In another example, if the difference between the second intra prediction mode's cost and the first intra prediction mode's cost is less than a threshold, the video coder may take the first intra prediction mode without the fusion. Otherwise, the video coder may fuse the first and second intra prediction modes.

In some examples, if both derived modes are the same, the video coder does not apply the fusion applied. Otherwise, the video coder applies the fusion. In other words, the video coder may generate the prediction block based on the fusion of the preliminary blocks based on the first intra prediction mode and the second intra prediction mode being different.

In some examples, the video coder estimates the cost of the fusion mode, e.g., using SATD cost. If such cost is higher than the cost of the no fusion mode (i.e., the cost of not performing fusion), the video coder does not apply the fusion.

In some examples, the video coder computes the predictions of fused modes based on prediction parameters derived from the different subblock sizes. For example, under Intra-Sub-Partitions (ISP) mode, the current CU may be divided into four equal-sized sub-segments (i.e., sub-blocks). Given that the current CU is predicted with an intra prediction mode X, the video coder uses intra prediction mode X and reference samples above and left of the current CU to predict intra prediction samples for the first sub-block. The video coder then generates intra prediction samples for the next sub-block of the current CU using intra prediction mode X but with the updated reference samples that include reconstructed samples from the first sub-block. The video coder may repeat this process until the video coder has generated intra prediction samples for all sub-blocks. The video coder may compute the prediction parameters based on subblock sizes. The prediction parameters may include whether intra reference smoothing is applied, whether position dependent intra prediction combination (PDPC) is applied, whether gradient PDPC is applied, parameters that control how many samples in one row are affected by PDPC, whether to apply reference interpolation or prediction interpolation, angular parameters for respective angular modes, etc. In general, these prediction parameters are the intra parameters that are block size dependent. Intra angle parameters may be integerized tangent or co-tangent values with high precision. In accordance with one or more techniques of this disclosure, those intra parameters may be computed based on the whole block size not the subblock sizes.

In one example, when fusion is applied, one mode, for example the first mode, may have the prediction parameters computed on the subblocks sizes, but the other modes, for example the second mode, may have those parameters computed on the whole block size. In another example, the video coder computes all parameters using the same method for all derived modes, for example using the whole block size. The video coder may perform different processes to compute different prediction parameters based on the sub-block sizes. For instance, with respect to PDPC, there is one parameter called angularScale that is dependent on block/subblock size to control the number of samples that is needed to be corrected by PDPC. Whether to apply PDPC may also depend on block size such that, if the size is greater than certain threshold and multiple reference line (MRL) method is not applied, the video coder may apply PDPC on this block.

In some examples, the video coder takes the first two intra prediction modes, mode1 and mode2, with the lowest cost, cost1 and cost2, from TIMD modes. The video coder computes weights for fusion of mode1 and mode2 from cost1 and cost2 as $$\frac{cost2}{cost1 + cost2} \text{ and } \frac{cost1}{cost1 + cost2}.$$

In some examples, the video coder takes the first two modes, mode1 and mode2, with the lowest cost, cost1 and cost2, from TIMD modes. In some examples, if cost2−cost1<=cost1, the video coder fuses mode1 and mode2 with the weights derived based on the costs, for example as $$\frac{cost2}{cost1 + cost2} \text{ and } \frac{cost1}{cost1 + cost2}.$$

Otherwise, the video coder uses only mode1 with the smallest cost between cost1 and cost2 and the video coder does not apply fusion. In some examples, if cost2−cost1<=cost1 and mode 1 is not equal to mode2, the video coder fuses mode1 and mode2 with the weights derived based on the costs, e.g., as $$\frac{cost2}{cost1 + cost2} \text{ and } \frac{cost1}{cost1 + cost2}.$$

Otherwise, the video coder only uses mode1 with the smallest cost between cost1 and cost2 and the video coder does not apply fusion In some examples, the video coder takes the first two intra prediction modes, mode1 and mode2, with the lowest cost, cost1 and cost2, from TIMD modes. If cost2−cost1<=cost1, the video coder may fuse mode1 and mode2 with the weights derived based on the costs, e.g., as $$\frac{cost2}{cost1 + cost2} \text{ and } \frac{cost1}{cost1 + cost2}.$$

Otherwise, the video coder may use only mode1 with the smallest cost between cost1 and cost2 and the video coder does not apply fusion. When the fusion is under ISP mode, the video coder may derive parameters for prediction of mode1 from the sizes of sub-segments for the current CU, and the video coder may derive the prediction parameters (e.g., for prediction of mode2 from the size of the current CU.

As mentioned above, there could be multiple ways of deriving intra prediction modes without explicit intra direction signaling, for example a DIMD or TIMD process. For example, a video coder (e.g., video encoder 200 or video decoder 300) may set the derived mode equal to a predefined mode. In this case, the derivation process is not needed. For example, the video coder may set the derived mode equal to a non-angular mode, such as planar or DC mode.

Weighting (in other words fusing) of several modes may provide a better variety of predictors. For example, in a DIMD process, planar mode and two derived modes can be fused to form a predictor. In accordance with a technique of this disclosure, the video coder may fuse several modes, but some of intra directions are explicitly signaled and some intra directions are derived. This method is referred to herein as mixed mode. The mixed mode can be indicated by a flag. The flag can be signaled conditionally, for example, if only derived modes (for example, DIMD coding mode) are not used then a flag is signaled to indicate whether the derived and signaled modes are mixed.

In one example, one intra prediction mode is signaled using regular intra prediction mode direction signaling (e.g., without using DIMD or TIMD) and the other intra prediction mode is derived using DIMD or TIMD process. In some examples, the fusing weight between the two intra prediction modes can be represented as 0.5, i.e., equal weight. In other examples, more weight can be given to the signaled intra prediction mode because video encoder 200 has more control to find a better intra prediction direction and signal the intra prediction direction, contrary to the derived intra prediction mode which may only depend on the reconstructed neighbor samples.

In the mixed mode, the video coder may add signaled and derived modes to the MPM list. In another alternative, the video coder only adds the signaled intra prediction mode(s) to the MPM list. Because the derived mode can be equal to the signaled mode, there is a redundancy when those modes are the same. To avoid this redundancy, the video coder may modify the derived mode in the case the derived mode is equal to the signaled mode. The video coder may perform the modification by adding an offset of +−1, +−2, and so on. In another example, if the intra prediction modes are equal, the video coder may set the derived mode equal to a non-angular mode, such as planar or DC mode. If both intra prediction modes are planar, the video coder may set the derived modes equal to DC mode. If both intra prediction modes are DC modes, the video coder may set the derived mode equal to planar mode.

In the above examples, the video coder modifies the derived mode. In an alternative solution, the video coder may modify the signaled mode after signaling if the signaled mode is equal to the derived mode.

In the above description, one signaled and one derived mode were used as an example, and more than one signaled and/or more than one derived mode can be used in the disclosed method. The number of modes can be signaled in a parameter set, slice or picture headers or elsewhere, or can be fixed to a certain value.

In another example, a video coder (e.g., video encoder 200 or video decoder 300) may derive certain signaled and/or derived modes from further distant neighbor samples, and the video coder may derive some other signaled and/or derived modes using closer neighbor samples to the current block neighbor samples.

In a more general way, the derived modes and signaled modes can be merged into one intra prediction method. A syntax signaling may be introduced to indicate the following cases:
  whether only one intra prediction mode is used and
    whether the intra prediction mode is a derived mode or a signaled mode,
  whether the intra prediction mode is a derived mode, where two or more modes are all derived,
  whether the intra prediction mode is a mixed mode, whether one or more modes are derived, and one or more modes are signaled,
  whether the intra prediction mode is a mixed mode, but two or more modes are all signaled.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 5:
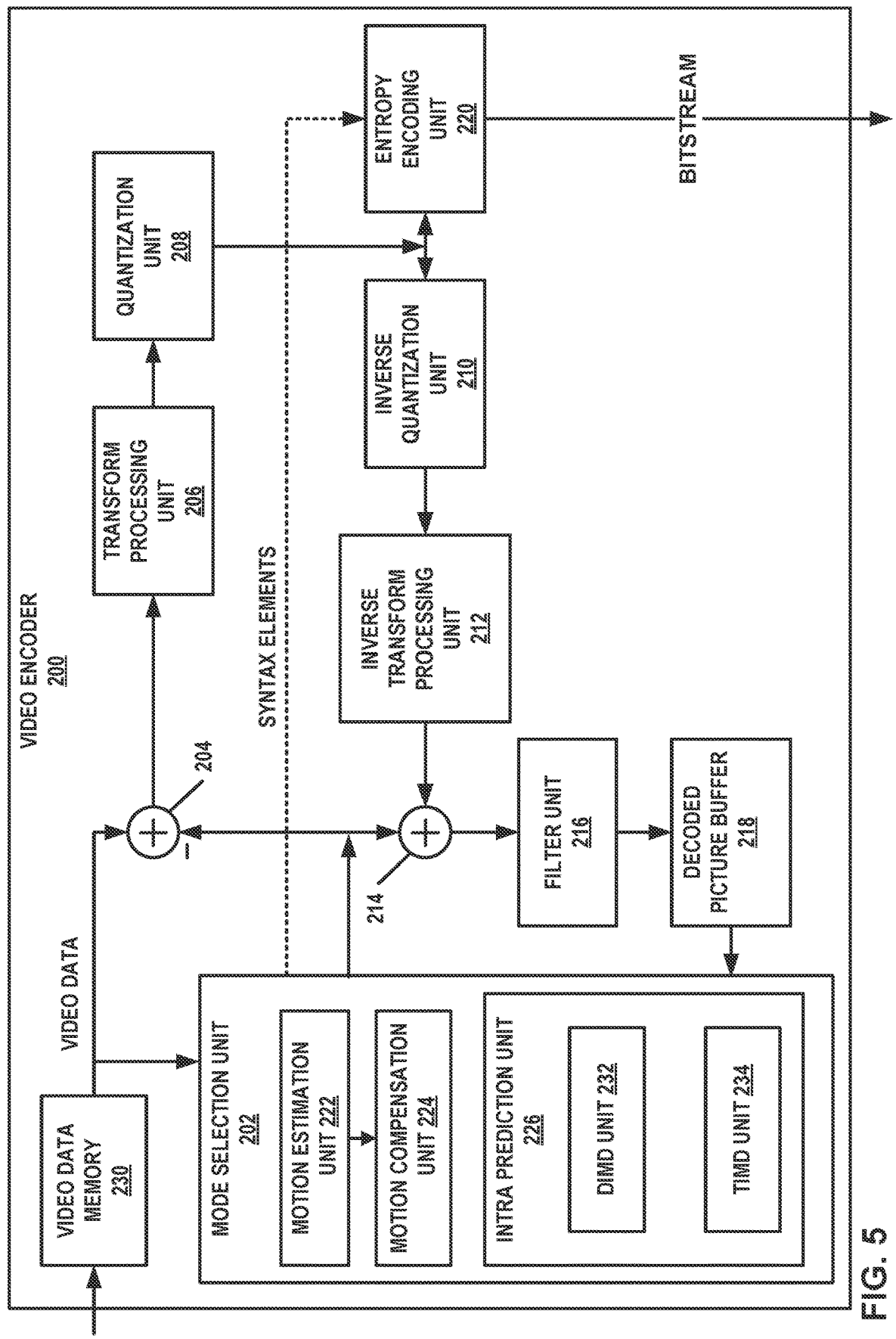
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra prediction unit 226 may generate the prediction block from samples neighboring the current block. For example, for directional modes, intra prediction unit 226 may generally mathematically combine values of neighboring samples and populate these calculated values in the defined direction across the current block to produce the prediction block. As another example, for DC mode, intra prediction unit 226 may calculate an average of the neighboring samples to the current block and generate the prediction block to include this resulting average for each sample of the prediction block.

In the example of FIG. 5, intra prediction unit 226 may include a DIMD unit 232 and a TIMD unit 234. DIMD unit 232 may generate a prediction block for the current block in accordance with any of the examples of this disclosure that use a DIMD process. Similarly, TIMD unit 234 may generate a prediction block for the current block in accordance with any of the examples of this disclosure that use a TIMD process.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

In some examples, video encoder 200 represents an example of a device configured to encode video data including a memory configured to store video data, and one or more processing units implemented in circuitry and configured to determine a Histogram of Gradient (HoG) vector for a block of the video data, wherein the HoG vector for the block includes magnitudes for a plurality of directions; determine a first intra prediction mode, a second intra prediction mode, and a third intra prediction mode as intra prediction modes corresponding to directions with greatest magnitudes in the HoG vector; derive weights based on the magnitudes in the HoG vector for the directions corresponding to the first intra prediction mode, the second intra prediction mode, and the third intra prediction mode; determine preliminary prediction blocks for the first intra prediction mode, the second intra prediction mode, the third intra prediction mode, and a planar mode; generate a prediction block based on a fusion of the preliminary prediction blocks weighted according to the weights and a weight for the planar mode; and encode the block based on the prediction block.

In some examples, video encoder 200 represents an example of a device configured to encode video data including a memory configured to store video data, and one or more processing units implemented in circuitry and configured to determine a Histogram of Gradient (HoG) vector for a block of the video data, wherein the HoG vector for the block includes magnitudes for a plurality of directions; determine a first intra prediction mode, wherein the first intra prediction mode corresponds to a direction with a greatest magnitude in the HoG vector; generate a first candidate list based on the first intra prediction mode, wherein the candidate list includes a first plurality of intra prediction modes; for each intra prediction mode in the first candidate list: compute prediction samples of template regions using the intra prediction mode in the first candidate list, wherein the template regions are above the block and left of the block; determine a cost for the intra prediction mode in the first candidate list based on the prediction samples of the template regions computed using the intra prediction mode in the first candidate list and reconstructed samples of the template regions; determine a lowest-cost mode in the first candidate list based on the costs for the intra prediction modes in the first candidate list; determine a second intra prediction mode, wherein the second intra prediction mode corresponds to a direction with a second greatest magnitude in the HoG vector; generate a second candidate list based on the first intra prediction mode, wherein the second candidate list includes a second plurality of intra prediction modes; for each intra prediction mode in the second candidate list: compute prediction samples of the template regions using the intra prediction mode in the second candidate list; determine a cost for the intra prediction mode in the second candidate list based on the prediction samples of the template regions computed using the intra prediction mode in the second candidate list and the reconstructed samples of the template regions; determine a lowest-cost mode in the second candidate list based on the costs for the intra prediction modes in the second candidate list; determine preliminary prediction blocks for the lowest-cost mode in the first candidate list and the lowest-cost mode in the second candidate list; generate a prediction block based on a fusion of at least the preliminary prediction blocks; and encode the block based on the prediction block.

In some examples, video encoder 200 represents an example of a device configured to encode video data including a memory configured to store video data, and one or more processing units implemented in circuitry and configured to: for each respective intra prediction mode of a plurality of non-planar intra prediction modes in a most-probable mode (MPM) list: generate prediction samples of template regions using the respective intra prediction mode, wherein the template regions are above and left of a block of the video data; and compute a cost for the respective intra prediction mode based on differences between (1) the prediction samples of the template regions generated using the respective intra prediction mode and (2) reconstructed samples of the template regions; sort the plurality of non-planar intra prediction modes in the MPM list based on the costs for the non-planar intra prediction modes; determine a selected intra prediction mode in the MPM list; generate a prediction block using the selected intra prediction mode; and encode the block based on the prediction block.

In some examples, video encoder 200 represents an example of a device configured to encode video data including a memory configured to store video data, and one or more processing units implemented in circuitry and configured to: for each respective intra prediction mode of a plurality of intra prediction modes in a most-probable mode (MPM) list: generate, based on references samples for a template region and using the respective intra prediction mode, prediction samples for the template region, wherein the template region is above or left of a block of the video data; determine a cost for the respective intra prediction mode based on differences between (1) the prediction samples for the template region and (2) reconstructed samples for the template region; determine a first intra prediction mode and a second intra prediction mode, wherein the first intra prediction mode and the second intra prediction mode are intra prediction modes in the MPM list having lowest costs; determine weights for the first intra prediction mode and the second intra prediction mode; determine preliminary prediction blocks for the first intra prediction mode and the second intra prediction mode; generate a prediction block based on a fusion of the preliminary prediction blocks weighted according to the weights for the first intra prediction mode and the second intra prediction mode; and encode the block based on the prediction block.

In some examples, video encoder 200 represents an example of a device configured to encode video data including a memory configured to store video data, and one or more processing units implemented in circuitry and configured to: for each respective intra prediction mode of a plurality of intra prediction modes in a most-probable mode (MPM) list: generate, based on references samples for a template region and using the respective intra prediction mode, prediction samples for the template region, wherein the template region is above or left of a block of the video data; determine a cost for the respective intra prediction mode based on differences between (1) the prediction samples for the template region and (2) reconstructed samples for the template region; determine a first intra prediction mode and a second intra prediction mode, wherein the first intra prediction mode and the second intra prediction mode are intra prediction modes in the MPM list having lowest costs; based on the second intra prediction mode minus the cost of the first intra prediction mode being less than the cost of the first intra prediction mode: determine weights for the first intra prediction mode and the second intra prediction mode; determine preliminary prediction blocks for the first intra prediction mode and the second intra prediction mode; generate a prediction block based on a fusion of the preliminary prediction blocks weighted according to the weights for the first intra prediction mode and the second intra prediction mode; and encode the block based on the prediction block.

Figure 6:
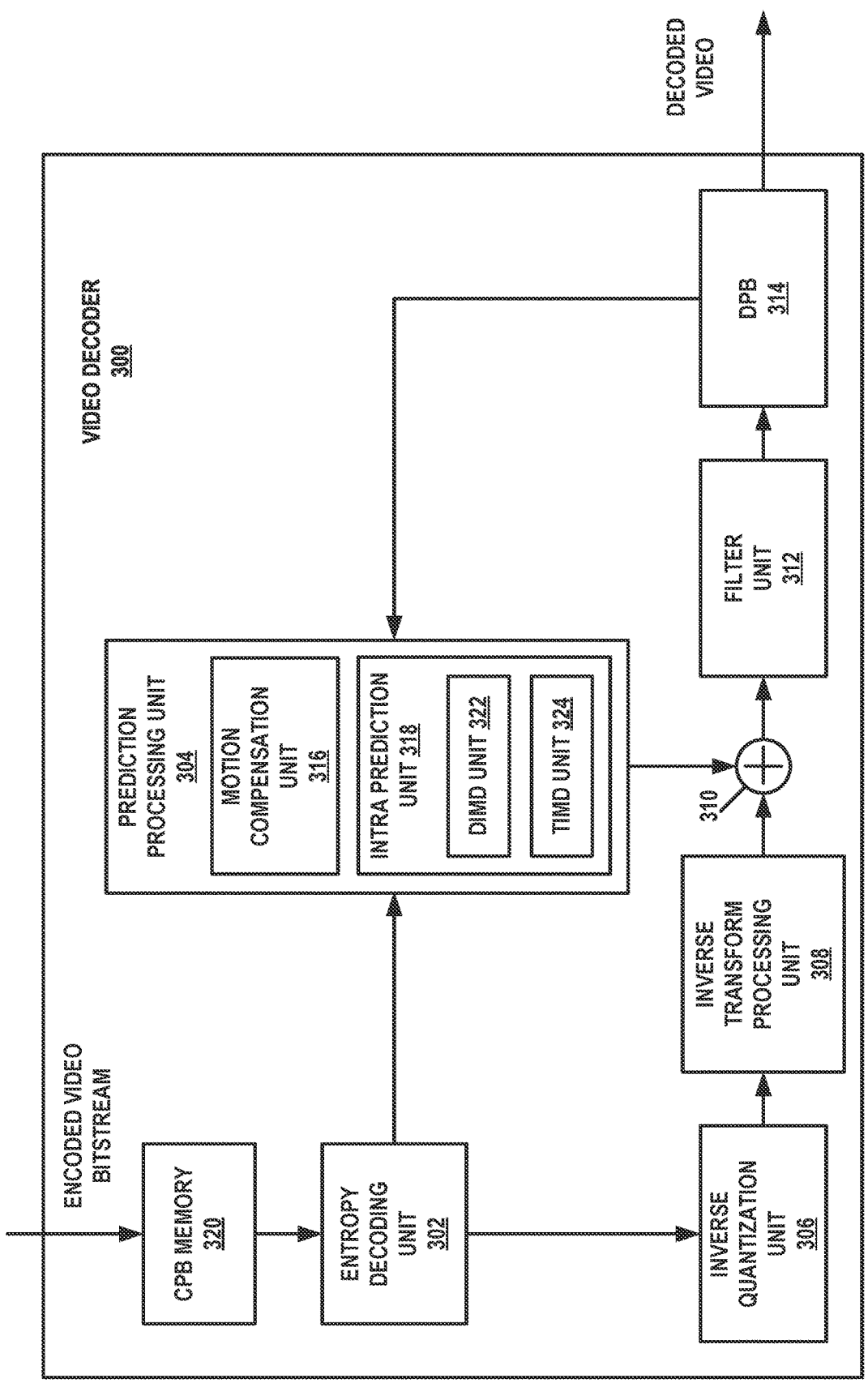
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra prediction unit 318 may generate the prediction block according to an intra-prediction mode indicated by the prediction information syntax elements. Again, intra prediction unit 318 may generally perform the intra-prediction process in a manner that is substantially similar to that described with respect to intra prediction unit 226 (FIG. 5). Intra prediction unit 318 may retrieve data of neighboring samples to the current block from DPB 314.

In the example of FIG. 6, intra prediction unit 318 include a DIMD unit 322 and a TIMD unit 324. DIMD unit 322 may generate a prediction block for the current block in accordance with any of the examples of this disclosure that use a DIMD process. Similarly, TIMD unit 324 may generate a prediction block for the current block in accordance with any of the examples of this disclosure that use a TIMD process.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In some examples, video decoder 300 represents an example of a device configured to encode video data including a memory configured to store video data, and one or more processing units implemented in circuitry and configured to determine a Histogram of Gradient (HoG) vector for a block of the video data, wherein the HoG vector for the block includes magnitudes for a plurality of directions; determine a first intra prediction mode, a second intra prediction mode, and a third intra prediction mode as intra prediction modes corresponding to directions with greatest magnitudes in the HoG vector; derive weights based on the magnitudes in the HoG vector for the directions corresponding to the first intra prediction mode, the second intra prediction mode, and the third intra prediction mode; determine preliminary prediction blocks for the first intra prediction mode, the second intra prediction mode, the third intra prediction mode, and a planar mode; generate a prediction block based on a fusion of the preliminary prediction blocks weighted according to the weights and a weight for the planar mode; and reconstruct the block based on the prediction block.

In some examples, video decoder 300 represents an example of a device configured to encode video data including a memory configured to store video data, and one or more processing units implemented in circuitry and configured to determine a Histogram of Gradient (HoG) vector for a block of the video data, wherein the HoG vector for the block includes magnitudes for a plurality of directions; determine a first intra prediction mode, wherein the first intra prediction mode corresponds to a direction with a greatest magnitude in the HoG vector; generate a first candidate list based on the first intra prediction mode, wherein the candidate list includes a first plurality of intra prediction modes; for each intra prediction mode in the first candidate list: compute prediction samples of template regions using the intra prediction mode in the first candidate list, wherein the template regions are above the block and left of the block; determine a cost for the intra prediction mode in the first candidate list based on the prediction samples of the template regions computed using the intra prediction mode in the first candidate list and reconstructed samples of the template regions; determine a lowest-cost mode in the first candidate list based on the costs for the intra prediction modes in the first candidate list; determine a second intra prediction mode, wherein the second intra prediction mode corresponds to a direction with a second greatest magnitude in the HoG vector; generate a second candidate list based on the first intra prediction mode, wherein the second candidate list includes a second plurality of intra prediction modes; for each intra prediction mode in the second candidate list: compute prediction samples of the template regions using the intra prediction mode in the second candidate list; determine a cost for the intra prediction mode in the second candidate list based on the prediction samples of the template regions computed using the intra prediction mode in the second candidate list and the reconstructed samples of the template regions; determine a lowest-cost mode in the second candidate list based on the costs for the intra prediction modes in the second candidate list; determine preliminary prediction blocks for the lowest-cost mode in the first candidate list and the lowest-cost mode in the second candidate list; generate a prediction block based on a fusion of at least the preliminary prediction blocks; and reconstruct the block based on the prediction block.

In some examples, video decoder 300 represents an example of a device configured to encode video data including a memory configured to store video data, and one or more processing units implemented in circuitry and configured to: for each respective intra prediction mode of a plurality of non-planar intra prediction modes in a most-probable mode (MPM) list: generate prediction samples of template regions using the respective intra prediction mode, wherein the template regions are above and left of a block of the video data; and compute a cost for the respective intra prediction mode based on differences between (1) the prediction samples of the template regions generated using the respective intra prediction mode and (2) reconstructed samples of the template regions; sort the plurality of non-planar intra prediction modes in the MPM list based on the costs for the non-planar intra prediction modes; determine a selected intra prediction mode in the MPM list; generate a prediction block using the selected intra prediction mode; and reconstruct the block based on the prediction block.

In some examples, video decoder 300 represents an example of a device configured to encode video data including a memory configured to store video data, and one or more processing units implemented in circuitry and configured to: for each respective intra prediction mode of a plurality of intra prediction modes in a most-probable mode (MPM) list: generate, based on references samples for a template region and using the respective intra prediction mode, prediction samples for the template region, wherein the template region is above or left of a block of the video data; determine a cost for the respective intra prediction mode based on differences between (1) the prediction samples for the template region and (2) reconstructed samples for the template region; determine a first intra prediction mode and a second intra prediction mode, wherein the first intra prediction mode and the second intra prediction mode are intra prediction modes in the MPM list having lowest costs; determine weights for the first intra prediction mode and the second intra prediction mode; determine preliminary prediction blocks for the first intra prediction mode and the second intra prediction mode; generate a prediction block based on a fusion of the preliminary prediction blocks weighted according to the weights for the first intra prediction mode and the second intra prediction mode; and reconstruct the block based on the prediction block.

In some examples, video decoder 300 represents an example of a device configured to encode video data including a memory configured to store video data, and one or more processing units implemented in circuitry and configured to: for each respective intra prediction mode of a plurality of intra prediction modes in a most-probable mode (MPM) list: generate, based on references samples for a template region and using the respective intra prediction mode, prediction samples for the template region, wherein the template region is above or left of a block of the video data; determine a cost for the respective intra prediction mode based on differences between (1) the prediction samples for the template region and (2) reconstructed samples for the template region; determine a first intra prediction mode and a second intra prediction mode, wherein the first intra prediction mode and the second intra prediction mode are intra prediction modes in the MPM list having lowest costs; based on the second intra prediction mode minus the cost of the first intra prediction mode being less than the cost of the first intra prediction mode: determine weights for the first intra prediction mode and the second intra prediction mode; determine preliminary prediction blocks for the first intra prediction mode and the second intra prediction mode; generate a prediction block based on a fusion of the preliminary prediction blocks weighted according to the weights for the first intra prediction mode and the second intra prediction mode; and reconstruct the block based on the prediction block.

Figure 7:
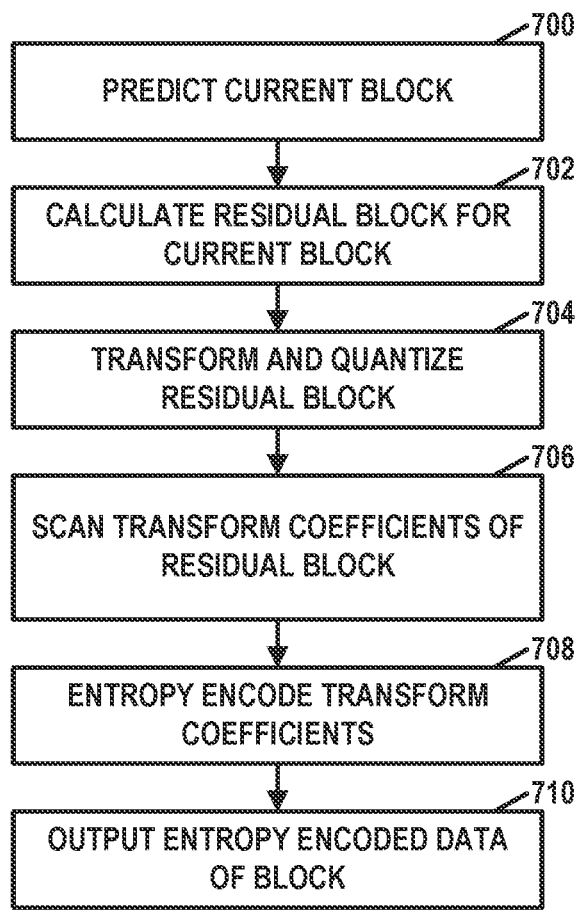
FIG. 7 is a flowchart illustrating an example method for encoding a current block in accordance with the techniques of this disclosure.

FIG. 7 is a flowchart illustrating an example method for encoding a current block in accordance with the techniques of this disclosure. The current block may comprise a current CU. Although described with respect to video encoder 200 (FIGS. 1 and 5), it should be understood that other devices may be configured to perform a method similar to that of FIG. 7.

In this example, video encoder 200 initially predicts the current block (700). For example, video encoder 200 may generate a prediction block for the current block. Video encoder 200 may use the DIMD or TIMD processes of this disclosure to generate the prediction block for the current block. Video encoder 200 may then calculate a residual block for the current block (702). To calculate the residual block, video encoder 200 may calculate a difference between the original, unencoded block and the prediction block for the current block. Video encoder 200 may then transform the residual block and quantize transform coefficients of the residual block (704). Next, video encoder 200 may scan the quantized transform coefficients of the residual block (706). During the scan, or following the scan, video encoder 200 may entropy encode the transform coefficients (708). For example, video encoder 200 may encode the transform coefficients using CAVLC or CABAC. Video encoder 200 may then output the entropy encoded data of the block (710).

Figure 8:
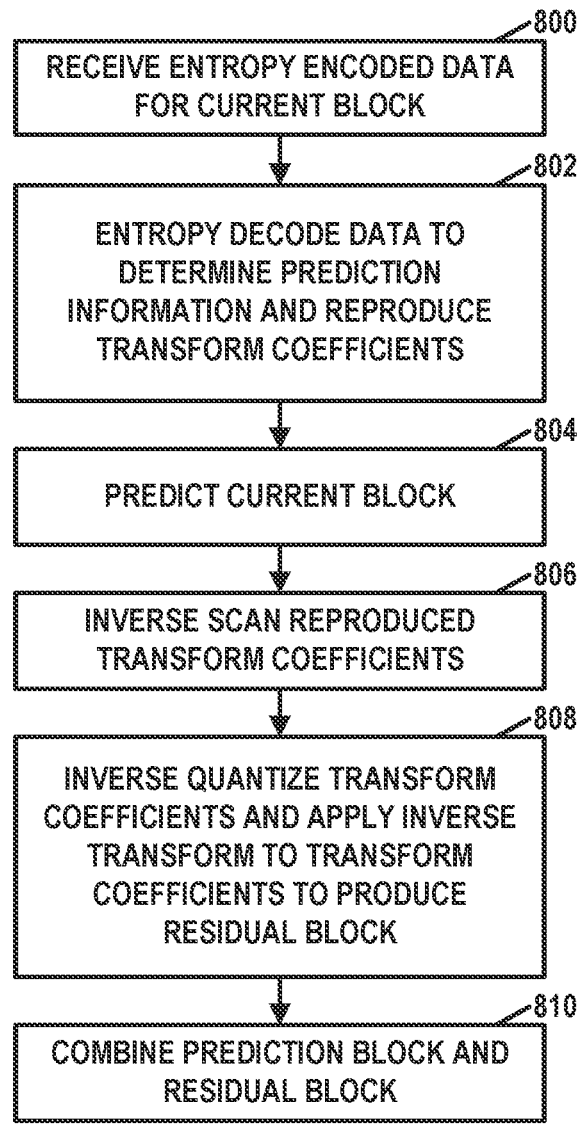
FIG. 8 is a flowchart illustrating an example method for decoding a current block in accordance with the techniques of this disclosure.

FIG. 8 is a flowchart illustrating an example method for decoding a current block of video data in accordance with the techniques of this disclosure. The current block may comprise a current CU. Although described with respect to video decoder 300 (FIGS. 1 and 6), it should be understood that other devices may be configured to perform a method similar to that of FIG. 8.

Video decoder 300 may receive entropy encoded data for the current block, such as entropy encoded prediction information and entropy encoded data for transform coefficients of a residual block corresponding to the current block (800). Video decoder 300 may entropy decode the entropy encoded data to determine prediction information for the current block and to reproduce transform coefficients of the residual block (802). Video decoder 300 may predict the current block (804), e.g., using an intra- or inter-prediction mode as indicated by the prediction information for the current block, to calculate a prediction block for the current block. Video decoder 300 may use the DIMD or TIMD processes of this disclosure to generate the prediction block for the current block. Video decoder 300 may then inverse scan the reproduced transform coefficients (806), to create a block of quantized transform coefficients. Video decoder 300 may then inverse quantize the transform coefficients and apply an inverse transform to the transform coefficients to produce a residual block (808). Video decoder 300 may ultimately decode the current block by combining the prediction block and the residual block (810).

Figure 9:
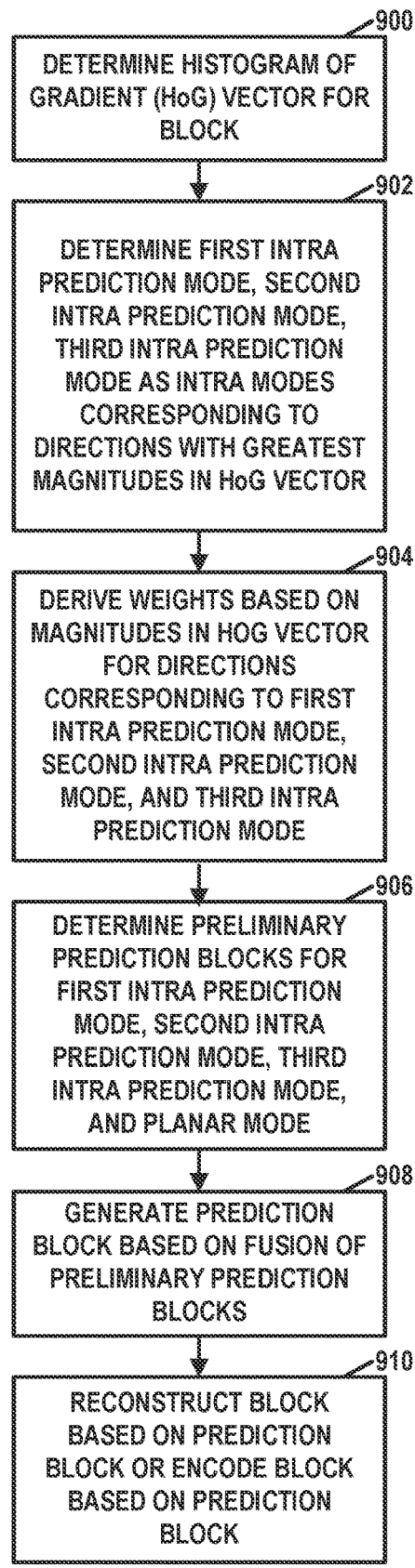
FIG. 9 is a flowchart illustrating a first example method of encoding or decoding video data using decoder side intra mode derivation (DIMD), in accordance with one or more techniques of this disclosure.

FIG. 9 is a flowchart illustrating a first example method of encoding or decoding video data using decoder side intra mode derivation (DIMD), in accordance with one or more techniques of this disclosure. The flowcharts of this disclosure are provided as examples. Other example processes in accordance with the techniques of this disclosure may include more, fewer, or different actions, or actions may be performed in different orders or in parallel.

In the example of FIG. 9, a video coder (e.g., video encoder 200 or video decoder 300) may determine a HoG vector for a block of the video data (900). The HoG vector for the block includes magnitudes for a plurality of directions. The video coder may determine the HoG vector as described elsewhere in this disclosure.

Additionally, the video coder may determine a first intra prediction mode, a second intra prediction mode, and a third intra prediction mode as intra prediction modes corresponding to directions with greatest magnitudes in the HoG vector (902). The video coder may derive weights based on the magnitudes in the HoG vector for the directions corresponding to the first intra prediction mode, the second intra prediction mode, and the third intra prediction mode (904). For example, mode1, mode2 and mode3 may denote the first three intra prediction modes from DIMD with normalized magnitudes mag1 and mag2, mag3. The video coder may determine the weights for the first intra prediction mode, the second intra prediction mode, the third intra prediction mode, and the planar mode as $$\frac{3 mag1}{4(mag1 + mag2 + mag3)},$$

$$\frac{3 mag2}{4(mag1 + mag2 + mag3)}, \frac{3 mag3}{4(mag1 + mag2 + mag3)},$$

and ¼.

Furthermore, the video coder may determine preliminary prediction blocks for the first intra prediction mode, the second intra prediction mode, the third intra prediction mode, and a planar mode (906). In other words, the video coder may use the first intra prediction mode to determine a first preliminary prediction block for the current block, use the second intra prediction mode to determine a second preliminary prediction block for the current block, use the third intra prediction mode to determine a third preliminary prediction block for the current block, and use the planar mode to determine a fourth preliminary prediction block for the current block.

The video coder may generate a prediction block based on a fusion of the preliminary prediction blocks weighted according to the weights and a weight for the planar mode (908). For example, the video coder may generate the prediction block by calculating, for each sample of the prediction block, a weighted average of corresponding samples of the preliminary prediction blocks.

The video coder may reconstruct the block based on the prediction block or encoding the block based on the prediction block (910). For instance, in examples where the video coder is video encoder 200, video encoder 200 may encode the block based on the prediction block. Encoding the block based on the prediction block may involve generating residual data based on the samples of the block and samples of the prediction block, applying a transform to the residual data, quantizing the transformed residual data, and entropy encoding syntax elements indicating the quantized transformed residual data. In examples where the video coder is video decoder 300, video decoder 300 may reconstruct the block based on the prediction block. Reconstructing the block based on the prediction block may involve adding samples of the prediction block to corresponding samples of residual data of the block.

Figure 10:
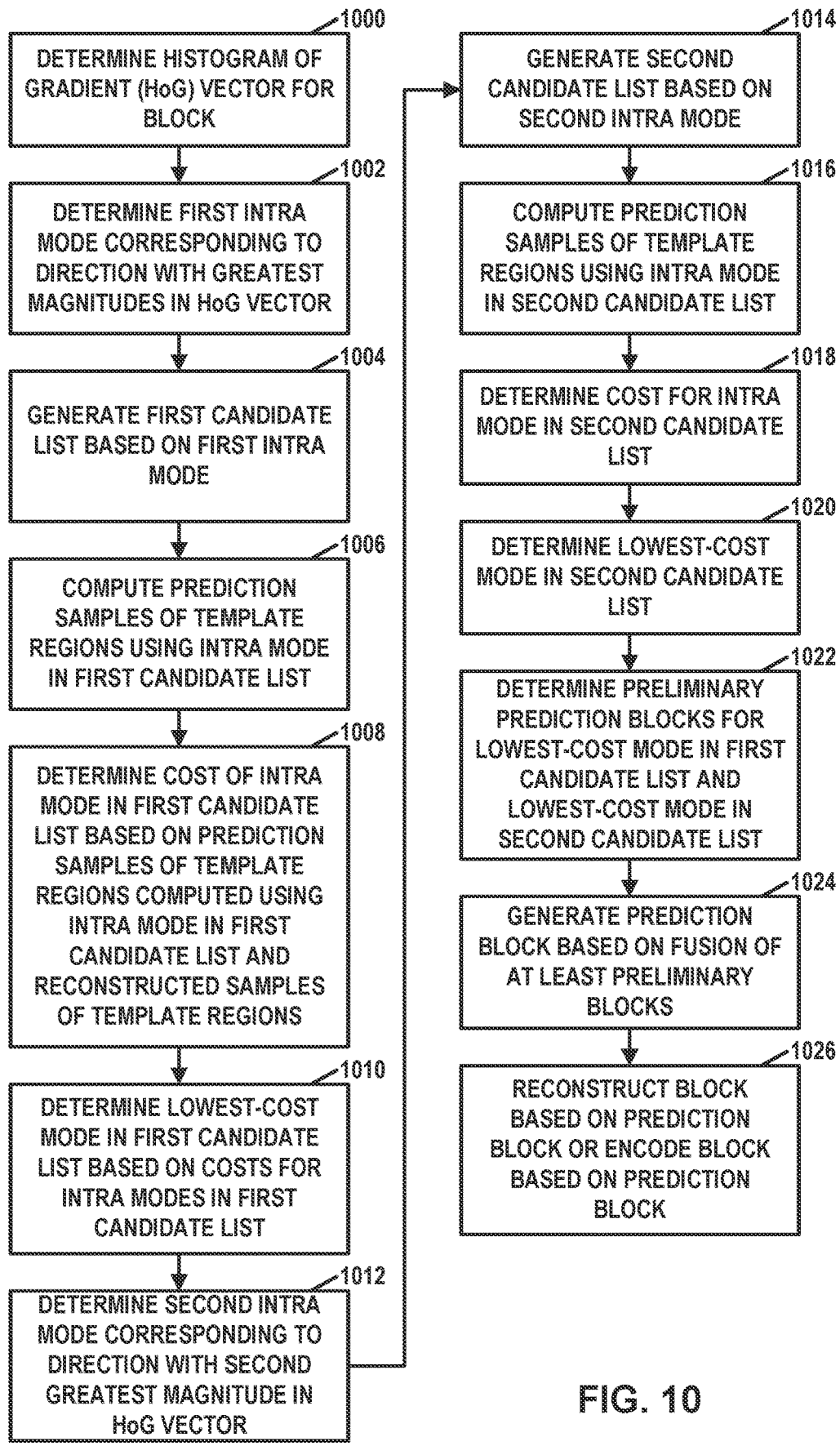
FIG. 10 is a flowchart illustrating a second example method of encoding or decoding video data using DIMD, in accordance with one or more techniques of this disclosure.

FIG. 10 is a flowchart illustrating a second example method of encoding or decoding video data using DIMD, in accordance with one or more techniques of this disclosure. In the example of FIG. 10, a video coder (e.g., video encoder 200 or video decoder 300) may determine a HoG vector for a block of the video data (1000). The HoG vector for the block includes magnitudes for a plurality of directions. The video coder may determine the HoG vector as described elsewhere in this disclosure.

Furthermore, the video coder may determine a first intra prediction mode (1002). The first intra prediction mode corresponds to a direction with a greatest magnitude in the HoG vector. The video coder may also generate a first candidate list based on the first intra prediction mode (1004). The candidate list includes a first plurality of intra prediction modes. In some examples, the candidate list includes intra prediction modes with directions adjacent to the intra prediction mode corresponding to the direction with the greatest magnitude in the HoG vector.

For each intra prediction mode in the first candidate list, the video coder may compute prediction samples of template regions using the intra prediction mode in the first candidate list, wherein the template regions are above the block and left of the block (1006). Furthermore, for each intra prediction mode in the first candidate list, the video coder may also determine a cost for the intra prediction mode in the first candidate list based on the prediction samples of the template regions computed using the intra prediction mode in the first candidate list and reconstructed samples of the template regions (1008). For example, the video coder may determine the cost as a SATD of the prediction samples of the template regions and the reconstructed samples of the template regions. The video coder may determine a lowest-cost mode in the first candidate list based on the costs for the intra prediction modes in the first candidate list (1010).

Additionally, in the example of FIG. 10, the video coder may determine a second intra prediction mode (1012). The second intra prediction mode corresponds to a direction with a second greatest magnitude in the HoG vector. The video coder may generate a second candidate list based on the first intra prediction mode (1014). The second candidate list includes a second plurality of intra prediction modes. In some examples, the candidate list includes intra prediction modes with directions adjacent to the second intra prediction mode.

For each intra prediction mode in the second candidate list, the video coder may compute prediction samples of the template regions using the intra prediction mode in the second candidate list (1016). Furthermore, for each intra prediction mode in the second candidate list, the video coder may determine a cost for the intra prediction mode in the second candidate list based on the prediction samples of the template regions computed using the intra prediction mode in the second candidate list and the reconstructed samples of the template regions (1018). For example, the video coder may determine the cost as a SATD of the prediction samples of the template regions and the reconstructed samples of the template regions. The video coder may determine a lowest-cost mode in the second candidate list based on the costs for the intra prediction modes in the second candidate list (1020).

Additionally, the video coder may determine preliminary prediction blocks for the lowest-cost mode in the first candidate list and the lowest-cost mode in the second candidate list (1022). The video coder may then generate a prediction block based on a fusion of at least the preliminary prediction blocks (1024). The video coder may reconstruct the block based on the prediction block or encode the block based on the prediction block. For instance, in examples where the video coder is video encoder 200, video encoder 200 may encode the block based on the prediction block. Encoding the block based on the prediction block may involve generating residual data based on the samples of the block and samples of the prediction block, applying a transform to the residual data, quantizing the transformed residual data, and entropy encoding syntax elements indicating the quantized transformed residual data. In examples where the video coder is video decoder 300, video decoder 300 may reconstruct the block based on the prediction block. Reconstructing the block based on the prediction block may involve adding samples of the prediction block to corresponding samples of residual data of the block.

Figure 11:
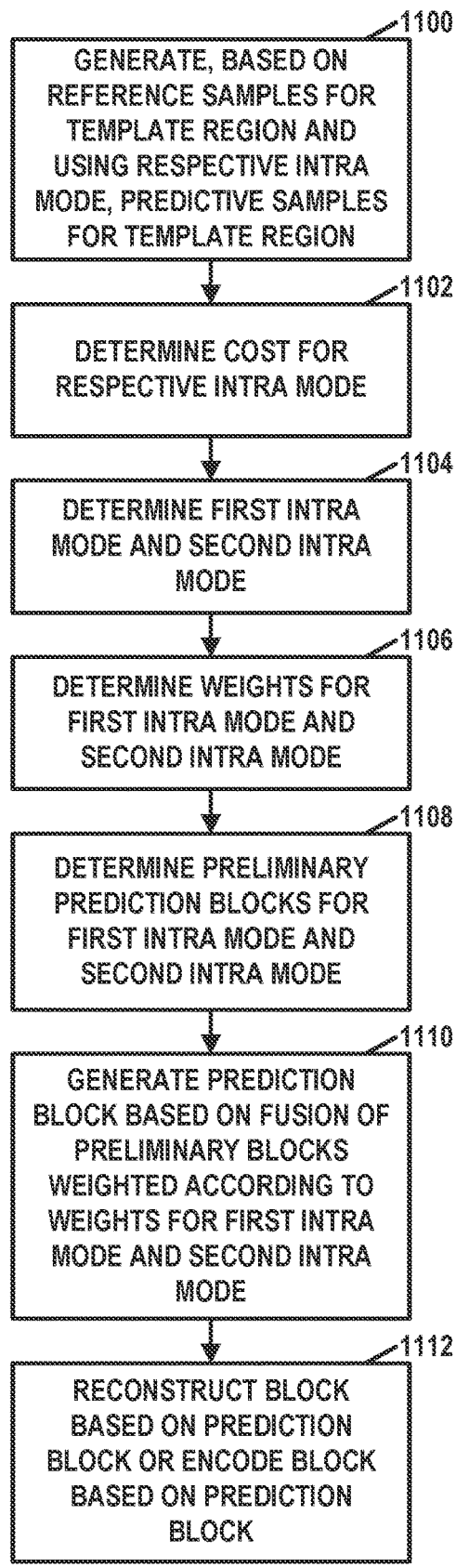
FIG. 11 is a flowchart illustrating an example method of encoding or decoding video data using template-based intra mode derivation (TIMD), in accordance with one or more techniques of this disclosure.

FIG. 11 is a flowchart illustrating an example method of encoding or decoding video data using template-based intra prediction mode derivation (TIMD), in accordance with one or more techniques of this disclosure. In the example of FIG. 11, a video coder (e.g., video encoder 200 or video decoder 300) may generate, based on reference samples for a template region and using the respective intra prediction mode, prediction samples for the template region (1100). The template region is above or left of a block of the video data.

Additionally, the video coder may determine a cost for the respective intra prediction mode based on differences between (1) the prediction samples for the template region and (2) reconstructed samples for the template region (1102). For example, the video coder may determine the cost for the respective intra prediction mode as a SATD of the prediction samples for the template region and the reconstructed samples for the template region. The video coder may repeat actions 1100 and 1102 for each respective intra prediction mode of a plurality of intra prediction modes in a MPM list.

The video coder may determine a first intra prediction mode and a second intra prediction mode (1104). The first intra prediction mode and the second intra prediction mode are intra prediction modes in the MPM list that have lowest costs.

Furthermore, the video coder may determine a weight for the first intra prediction mode and a weight for the second intra prediction mode (1106). The video coder may determine the weights in one of a variety of ways. For instance, the video coder may determine the weights based on the costs for the first and second intra prediction modes. For instance, the video coder may determine that a weight for an intra prediction mode proportional to the cost for the intra prediction mode. The sum of the weights for the first and second intra prediction modes may be equal to 1. In some examples, the video coder may determine the weight for the first intra prediction mode by dividing the cost for the second intra prediction mode by a sum of the costs for the first and second intra prediction modes. The video coder may determine the weights for the second intra prediction mode by dividing the cost for the first intra prediction mode by the sum of the first and second intra prediction modes.

The video coder may determine a preliminary prediction block for the first intra prediction mode and a preliminary prediction block for the second intra prediction mode (1108). In other words, the video coder may use the first intra prediction mode to determine a first preliminary prediction block for the current block and the video coder may use the second intra prediction mode to determine a second preliminary prediction block for the current block.

Additionally, the video coder may generate a prediction block based on a fusion of the preliminary prediction block for the first intra prediction mode and the preliminary prediction block for the second intra prediction mode weighted according to the weights for the first intra prediction mode and the second intra prediction mode (1110). For example, the video coder may generate the prediction block by calculating, for each sample of the prediction block, a weighted average of corresponding samples of the first and second preliminary prediction blocks. In some examples, the video coder may generate the prediction block based on the fusion of preliminary prediction blocks only when the first intra prediction mode and the second intra prediction mode are different. In other words, the video coder may generate the prediction block based on the fusion of the preliminary blocks based on the first intra prediction mode and the second intra prediction mode being different.

In some examples, the video coder may determine a cost of the fusion of the preliminary blocks. The video coder may generate the prediction block based on the fusion of preliminary blocks being less than a cost of any of the intra prediction modes. In other words, the cost of the fusion mode can be estimated, for example using SATD cost. If such cost is higher than the cost of the no fusion mode, then fusion is not applied.

In some examples, the video coder may generate the prediction block based on the fusion of the preliminary blocks based on prediction parameters derived from subblock sizes. In other words, whether or not the video coder generates the prediction block based on fusing the preliminary blocks may depend on one or more prediction parameters, where the prediction parameters are derived from subblock sizes. For instance, the video coder may compute the predictions of fused modes based on the prediction parameters derived from the different subblock sizes. For example, in the Intra-Sub-Partitions (ISP) mode, the current block may be divided into four equal-sized sub-segments. The video coder may compute the prediction parameters based on subblock sizes, those parameters may include whether intra reference smoothing is applied, whether PDPC is applied, and so on.

The video coder may reconstruct the block based on the prediction block or encoding the block based on the prediction block (1112). For instance, in examples where the video coder is video encoder 200, video encoder 200 may encode the block based on the prediction block. Encoding the block based on the prediction block may involve generating residual data based on the samples of the block and samples of the prediction block, applying a transform to the residual data, quantizing the transformed residual data, and entropy encoding syntax elements indicating the quantized transformed residual data. In examples where the video coder is video decoder 300, video decoder 300 may reconstruct the block based on the prediction block. Reconstructing the block based on the prediction block may involve adding samples of the prediction block to corresponding samples of residual data of the block.

In some examples, the video coder may perform steps 1106, 1108, 1110, and 1112 based on the cost of the second intra prediction mode minus the cost of the first intra prediction mode being less than the cost of the first intra prediction mode. For example, let mode1 and mode2 denote the first intra prediction mode and the second intra prediction mode and let cost1 and cost2 denote the costs of the first intra prediction mode and the second intra prediction mode. In this example, if cost2−cost1 <=cost1, the video coder may fuse the preliminary blocks generated based on mode1 and mode2 using the weights derive based on the costs, for example $$\frac{cost2}{cost1+cost2} \text{ and } \frac{cost1}{cost1+cost2}.$$

Otherwise, the video coder may use the preliminary block generated based on the lowest cost intra prediction mode as the prediction block for the block. Thus, the video coder may generate the prediction block based on a fusion of the preliminary prediction blocks weighted according to the weights for the first intra prediction mode and the second intra prediction mode based on the cost of the second intra prediction mode minus the cost of the first intra prediction mode being less than the cost of the first intra prediction mode.

The following is a non-limiting list of aspects that may be in accordance with one or more techniques of this disclosure.

Aspect 1: A method of encoding or decoding video data includes determining a Histogram of Gradient (HoG) vector for a block of the video data, wherein the HoG vector for the block includes magnitudes for a plurality of directions; determining a first intra mode, a second intra mode, and a third intra mode as intra modes corresponding to directions with greatest magnitudes in the HoG vector; deriving weights based on the magnitudes in the HoG vector for the directions corresponding to the first intra mode, the second intra mode, and the third intra mode; determining preliminary prediction blocks for the first intra mode, the second intra mode, the third intra mode, and a planar mode; generating a prediction block based on a fusion of the preliminary prediction blocks weighted according to the weights and a weight for the planar mode; and one of reconstructing the block based on the prediction block, or encoding the block based on the prediction block.

Aspect 2: A method of encoding or decoding video data includes determining a Histogram of Gradient (HoG) vector for a block of the video data, wherein the HoG vector for the block includes magnitudes for a plurality of directions; determining a first intra mode, wherein the first intra mode corresponds to a direction with a greatest magnitude in the HoG vector; generating a first candidate list based on the first intra mode, wherein the candidate list includes a first plurality of intra modes; for each intra mode in the first candidate list: computing prediction samples of template regions using the intra mode in the first candidate list, wherein the template regions are above the block and left of the block; determining a cost for the intra mode in the first candidate list based on the prediction samples of the template regions computed using the intra mode in the first candidate list and reconstructed samples of the template regions; determining a lowest-cost mode in the first candidate list based on the costs for the intra modes in the first candidate list; determining a second intra mode, wherein the second intra mode corresponds to a direction with a second greatest magnitude in the HoG vector; generating a second candidate list based on the first intra mode, wherein the second candidate list includes a second plurality of intra modes; for each intra mode in the second candidate list: computing prediction samples of the template regions using the intra mode in the second candidate list; determining a cost for the intra mode in the second candidate list based on the prediction samples of the template regions computed using the intra mode in the second candidate list and the reconstructed samples of the template regions; determining a lowest-cost mode in the second candidate list based on the costs for the intra modes in the second candidate list; determining preliminary prediction blocks for the lowest-cost mode in the first candidate list and the lowest-cost mode in the second candidate list; generating a prediction block based on a fusion of at least the preliminary prediction blocks; and one of reconstructing the block based on the prediction block, or encoding the block based on the prediction block.

Aspect 3: A method of encoding or decoding video data includes for each respective intra mode of a plurality of non-planar intra modes in a most-probable mode (MPM) list: generating prediction samples of template regions using the respective intra mode, wherein the template regions are above and left of a block of the video data; and computing a cost for the respective intra mode based on differences between (1) the prediction samples of the template regions generated using the respective intra mode and (2) reconstructed samples of the template regions; sorting the plurality of non-planar intra modes in the MPM list based on the costs for the non-planar intra modes; determining a selected intra mode in the MPM list; generating a prediction block using the selected intra mode; and one of reconstructing the block based on the prediction block, or encoding the block based on the prediction block.

Aspect 4: A method of encoding or decoding video data includes for each respective intra mode of a plurality of intra modes in a most-probable mode (MPM) list: generating, based on references samples for a template region and using the respective intra mode, prediction samples for the template region, wherein the template region is above or left of a block of the video data; determining a cost for the respective intra mode based on differences between (1) the prediction samples for the template region and (2) reconstructed samples for the template region; determining a first intra mode and a second intra mode, wherein the first intra mode and the second intra mode are intra modes in the MPM list having lowest costs; determining weights for the first intra mode and the second intra mode; determining preliminary prediction blocks for the first intra mode and the second intra mode; generating a prediction block based on a fusion of the preliminary prediction blocks weighted according to the weights for the first intra mode and the second intra mode; and one of reconstructing the block based on the prediction block, or encoding the block based on the prediction block.

Aspect 5: A method of encoding or decoding video data includes for each respective intra mode of a plurality of intra modes in a most-probable mode (MPM) list: generating, based on references samples for a template region and using the respective intra mode, prediction samples for the template region, wherein the template region is above or left of a block of the video data; determining a cost for the respective intra mode based on differences between (1) the prediction samples for the template region and (2) reconstructed samples for the template region; determining a first intra mode and a second intra mode, wherein the first intra mode and the second intra mode are intra modes in the MPM list having lowest costs; based on the second intra mode minus the cost of the first intra mode being less than the cost of the first intra mode: determining weights for the first intra mode and the second intra mode; determining preliminary prediction blocks for the first intra mode and the second intra mode; generating a prediction block based on a fusion of the preliminary prediction blocks weighted according to the weights for the first intra mode and the second intra mode; and one of reconstructing the block based on the prediction block, or encoding the block based on the prediction block.

Aspect 6: A device for coding video data, the device comprising one or more means for performing the method of any of aspects 1-5.

Aspect 7: The device of aspect 6, wherein the one or more means comprise one or more processors implemented in circuitry.

Aspect 8: The device of any of aspects 6 and 7, further comprising a memory to store the video data.

Aspect 9: The device of any of aspects 6-8, further comprising a display configured to display decoded video data.

Aspect 10: The device of any of aspects 6-9, wherein the device comprises one or more of a camera, a computer, a mobile device, a broadcast receiver device, or a set-top box.

Aspect 11: A computer-readable storage medium having stored thereon instructions that, when executed, cause one or more processors to perform the method of any of aspects 1-5.

Aspect 12: The method, device, or computer-readable medium of any of aspects 1-11, wherein one of reconstructing the block based on the prediction block or encoding the block based on the prediction block comprises reconstructing the block based on the prediction block.

Aspect 13: The method, device, or computer-readable medium of any of aspects 1-11, wherein one of reconstructing the block based on the prediction block or encoding the block based on the prediction block comprises encoding the block based on the prediction block.

Aspect 1A. A method of encoding or decoding video data, the method comprising: determining a Histogram of Gradient (HoG) vector for a block of the video data, wherein the HoG vector for the block includes magnitudes for a plurality of directions; determining a first intra mode, a second intra mode, and a third intra mode as intra modes corresponding to directions with greatest magnitudes in the HoG vector; deriving weights based on the magnitudes in the HoG vector for the directions corresponding to the first intra mode, the second intra mode, and the third intra mode; determining preliminary prediction blocks for the first intra mode, the second intra mode, the third intra mode, and a planar mode; generating a prediction block based on a fusion of the preliminary prediction blocks weighted according to the weights and a weight for the planar mode; and one of reconstructing the block based on the prediction block, or encoding the block based on the prediction block.

Aspect 1B. A method of encoding or decoding video data, the method comprising: determining a Histogram of Gradient (HoG) vector for a block of the video data, wherein the HoG vector for the block includes magnitudes for a plurality of directions; determining a first intra mode, wherein the first intra mode corresponds to a direction with a greatest magnitude in the HoG vector; generating a first candidate list based on the first intra mode, wherein the candidate list includes a first plurality of intra modes; for each intra mode in the first candidate list: computing prediction samples of template regions using the intra mode in the first candidate list, wherein the template regions are above the block and left of the block; determining a cost for the intra mode in the first candidate list based on the prediction samples of the template regions computed using the intra mode in the first candidate list and reconstructed samples of the template regions; determining a lowest-cost mode in the first candidate list based on the costs for the intra modes in the first candidate list; determining a second intra mode, wherein the second intra mode corresponds to a direction with a second greatest magnitude in the HoG vector; generating a second candidate list based on the first intra mode, wherein the second candidate list includes a second plurality of intra modes; for each intra mode in the second candidate list: computing prediction samples of the template regions using the intra mode in the second candidate list; determining a cost for the intra mode in the second candidate list based on the prediction samples of the template regions computed using the intra mode in the second candidate list and the reconstructed samples of the template regions; determining a lowest-cost mode in the second candidate list based on the costs for the intra modes in the second candidate list; determining preliminary prediction blocks for the lowest-cost mode in the first candidate list and the lowest-cost mode in the second candidate list; generating a prediction block based on a fusion of at least the preliminary prediction blocks; and one of reconstructing the block based on the prediction block, or encoding the block based on the prediction block.

Aspect 1C. A method of encoding or decoding video data, the method comprising: for each respective intra mode of a plurality of non-planar intra modes in a most-probable mode (MPM) list: generating prediction samples of template regions using the respective intra mode, wherein the template regions are above and left of a block of the video data; and computing a cost for the respective intra mode based on differences between (1) the prediction samples of the template regions generated using the respective intra mode and (2) reconstructed samples of the template regions; sorting the plurality of non-planar intra modes in the MPM list based on the costs for the non-planar intra modes; determining a selected intra mode in the MPM list; generating a prediction block using the selected intra mode; and one of reconstructing the block based on the prediction block, or encoding the block based on the prediction block.

Aspect 1D. A method of encoding or decoding video data, the method comprising: generating a most-probable mode (MPM) list that includes a plurality of intra modes, wherein the plurality of intra modes includes a plurality of non-planar intra modes; for each respective intra mode of the plurality of non-planar intra modes in the MPM list: generating prediction samples of template regions using the respective intra mode, wherein the template regions are above and left of a block of the video data; and computing a cost for the respective intra mode based on differences between (1) the prediction samples of the template regions generated using the respective intra mode and (2) reconstructed samples of the template regions; sorting the intra modes in the MPM list based on the cost for the intra modes; determining a selected intra mode in the MPM list; generating a prediction block using the selected intra mode; and one of reconstructing the block based on the prediction block, or encoding the block based on the prediction block.

Aspect 2D. The method of aspect 1D, wherein sorting the intra modes in the MPM list comprises sorting primary MPMs in the MPM list and not secondary MPMs in the MPM list.

Aspect 3D. The method of aspect 1D, wherein sorting the intra modes in the MPM list comprises sorting non-derived intra modes in the MPM list and not derived intra modes.

Aspect 4D. The method of aspect 1D, wherein sorting the intra modes in the MPM list comprises sorting a first N intra modes in the MPM list and not a second M intra modes in the MPM list, wherein N and M are non-zero numbers.

Aspect 1E. A method of encoding or decoding video data, the method comprising: for each respective intra mode of a plurality of intra modes in a most-probable mode (MPM) list: generating, based on references samples for a template region and using the respective intra mode, prediction samples for the template region, wherein the template region is above or left of a block of the video data; determining a cost for the respective intra mode based on differences between (1) the prediction samples for the template region and (2) reconstructed samples for the template region; determining a first intra mode and a second intra mode, wherein the first intra mode and the second intra mode are intra modes in the MPM list having lowest costs; determining weights for the first intra mode and the second intra mode; determining preliminary prediction blocks for the first intra mode and the second intra mode; generating a prediction block based on a fusion of the preliminary prediction blocks weighted according to the weights for the first intra mode and the second intra mode; and one of reconstructing the block based on the prediction block, or encoding the block based on the prediction block.

Aspect 2E. The method of aspect 1E, wherein generating the prediction block based on the fusion of the preliminary blocks comprises generating the prediction block based on the fusion of the preliminary blocks based on the first intra mode and the second intra mode being different.

Aspect 3E. The method of aspect 1E, wherein: the method further comprises determining a cost of the fusion of the preliminary blocks, and generating the prediction block based on the fusion of the preliminary blocks comprises generating the prediction block based on the fusion of the preliminary blocks based on the cost of the fusion being less than a cost of any of the intra modes.

Aspect 4E. The method of aspect 1E, wherein generating the prediction block based on the fusion of the preliminary prediction blocks comprises generating the prediction block based on prediction parameters derived from subblock sizes.

Aspect 1F. A method of encoding or decoding video data, the method comprising: for each respective intra mode of a plurality of intra modes in a most-probable mode (MPM) list: generating, based on references samples for a template region and using the respective intra mode, prediction samples for the template region, wherein the template region is above or left of a block of the video data; determining a cost for the respective intra mode based on differences between (1) the prediction samples for the template region and (2) reconstructed samples for the template region; determining a first intra mode and a second intra mode, wherein the first intra mode and the second intra mode are intra modes in the MPM list having lowest costs; based on the second intra mode minus the cost of the first intra mode being less than the cost of the first intra mode: determining weights for the first intra mode and the second intra mode; determining preliminary prediction blocks for the first intra mode and the second intra mode; generating a prediction block based on a fusion of the preliminary prediction blocks weighted according to the weights for the first intra mode and the second intra mode; and one of reconstructing the block based on the prediction block, or encoding the block based on the prediction block.

Aspect 2F. The method of aspect 1F, wherein generating the prediction block based on the fusion of the preliminary blocks comprises generating the prediction block based on the fusion of the preliminary blocks based on the first intra mode and the second intra mode being different.

Aspect 3F. The method of aspect 1F, wherein determining the weights for the first intra mode and the second intra mode comprises determining the weights for the first intra mode and the second intra mode based on the cost of the first intra mode and the cost of the second intra mode.

Aspect 1G. A device for coding video data, the device comprising one or more means for performing the method of any of aspects 1A-3F.

Aspect 2G. The device of aspect 1G, wherein the one or more means comprise one or more processors implemented in circuitry.

Aspect 3G. The device of aspect 1G, further comprising a memory to store the video data.

Aspect 4G. The device of aspect 1G, further comprising a display configured to display decoded video data.

Aspect 5G. The device of aspects 1G, wherein the device comprises one or more of a camera, a computer, a mobile device, a broadcast receiver device, or a set-top box.

Aspect 1H. A computer-readable storage medium having stored thereon instructions that, when executed, cause one or more processors to perform the method of any of aspects 1A-3F.

Aspect 11. The method, device, or computer-readable medium of any of aspects 1A-1H, wherein one of reconstructing the block based on the prediction block or encoding the block based on the prediction block comprises reconstructing the block based on the prediction block.

Aspect 21. The method, device, or computer-readable medium of any of aspects 1A-1H, wherein one of reconstructing the block based on the prediction block or encoding the block based on the prediction block comprises encoding the block based on the prediction block.

Aspect 1A'. A method of encoding or decoding video data, the method comprising: determining a Histogram of Gradient (HoG) vector for a block of the video data, wherein the HoG vector for the block includes magnitudes for a plurality of directions; determining a first intra mode, a second intra mode, and a third intra mode as intra modes corresponding to directions with greatest magnitudes in the HoG vector; deriving weights based on the magnitudes in the HoG vector for the directions corresponding to the first intra mode, the second intra mode, and the third intra mode; determining preliminary prediction blocks for the first intra mode, the second intra mode, the third intra mode, and a planar mode; generating a prediction block based on a fusion of the preliminary prediction blocks weighted according to the weights and a weight for the planar mode; and one of reconstructing the block based on the prediction block, or encoding the block based on the prediction block.

Aspect 1B'. A method of encoding or decoding video data, the method comprising: determining a Histogram of Gradient (HoG) vector for a block of the video data, wherein the HoG vector for the block includes magnitudes for a plurality of directions; determining a first intra mode, wherein the first intra mode corresponds to a direction with a greatest magnitude in the HoG vector; generating a first candidate list based on the first intra mode, wherein the candidate list includes a first plurality of intra modes; for each intra mode in the first candidate list: computing prediction samples of template regions using the intra mode in the first candidate list, wherein the template regions are above the block and left of the block; determining a cost for the intra mode in the first candidate list based on the prediction samples of the template regions computed using the intra mode in the first candidate list and reconstructed samples of the template regions; determining a lowest-cost mode in the first candidate list based on the costs for the intra modes in the first candidate list; determining a second intra mode, wherein the second intra mode corresponds to a direction with a second greatest magnitude in the HoG vector; generating a second candidate list based on the first intra mode, wherein the second candidate list includes a second plurality of intra modes; for each intra mode in the second candidate list: computing prediction samples of the template regions using the intra mode in the second candidate list; determining a cost for the intra mode in the second candidate list based on the prediction samples of the template regions computed using the intra mode in the second candidate list and the reconstructed samples of the template regions; determining a lowest-cost mode in the second candidate list based on the costs for the intra modes in the second candidate list; determining preliminary prediction blocks for the lowest-cost mode in the first candidate list and the lowest-cost mode in the second candidate list; generating a prediction block based on a fusion of at least the preliminary prediction blocks; and one of reconstructing the block based on the prediction block, or encoding the block based on the prediction block.

Aspect 1C'. A method of encoding or decoding video data, the method comprising: for each respective intra mode of a plurality of non-planar intra modes in a most-probable mode (MPM) list: generating prediction samples of template regions using the respective intra mode, wherein the template regions are above and left of a block of the video data; and computing a cost for the respective intra mode based on differences between (1) the prediction samples of the template regions generated using the respective intra mode and (2) reconstructed samples of the template regions; sorting the plurality of non-planar intra modes in the MPM list based on the costs for the non-planar intra modes; determining a selected intra mode in the MPM list; generating a prediction block using the selected intra mode; and one of reconstructing the block based on the prediction block, or encoding the block based on the prediction block.

Aspect 1D'. A method of encoding or decoding video data, the method comprising: generating a most-probable mode (MPM) list that includes a plurality of intra modes, wherein the plurality of intra modes includes a plurality of non-planar intra modes; for each respective intra mode of the plurality of non-planar intra modes in the MPM list: generating prediction samples of template regions using the respective intra mode, wherein the template regions are above and left of a block of the video data; and computing a cost for the respective intra mode based on differences between (1) the prediction samples of the template regions generated using the respective intra mode and (2) reconstructed samples of the template regions; sorting the intra modes in the MPM list based on the cost for the intra modes; determining a selected intra mode in the MPM list; generating a prediction block using the selected intra mode; and one of reconstructing the block based on the prediction block, or encoding the block based on the prediction block.

Aspect 2D'. The method of aspect 1D', wherein sorting the intra modes in the MPM list comprises sorting primary MPMs in the MPM list and not secondary MPMs in the MPM list.

Aspect 3D'. The method of any of aspects 1D'-2D', wherein sorting the intra modes in the MPM list comprises sorting non-derived intra modes in the MPM list and not derived intra modes.

Aspect 4D'. The method of any of aspects 1D'-3D', wherein sorting the intra modes in the MPM list comprises sorting a first N intra modes in the MPM list and not a second M intra modes in the MPM list, wherein N and M are non-zero numbers.

Aspect 1E'. A method of encoding or decoding video data, the method comprising: for each respective intra mode of a plurality of intra modes in a most-probable mode (MPM) list: generating, based on references samples for a template region and using the respective intra mode, prediction samples for the template region, wherein the template region is above or left of a block of the video data; determining a cost for the respective intra mode based on differences between (1) the prediction samples for the template region and (2) reconstructed samples for the template region; determining a first intra mode and a second intra mode, wherein the first intra mode and the second intra mode are intra modes in the MPM list having lowest costs; determining weights for the first intra mode and the second intra mode; determining preliminary prediction blocks for the first intra mode and the second intra mode; generating a prediction block based on a fusion of the preliminary prediction blocks weighted according to the weights for the first intra mode and the second intra mode; and one of reconstructing the block based on the prediction block, or encoding the block based on the prediction block.

Aspect 2E'. The method of aspect 1E', wherein generating the prediction block based on the fusion of the preliminary blocks comprises generating the prediction block based on the fusion of the preliminary blocks based on the first intra mode and the second intra mode being different.

Aspect 3E'. The method of any of aspects 1E'-2E', wherein: the method further comprises determining a cost of the fusion of the preliminary blocks, and generating the prediction block based on the fusion of the preliminary blocks comprises generating the prediction block based on the fusion of the preliminary blocks based on the cost of the fusion being less than a cost of any of the intra modes.

Aspect 4E'. The method of any of aspects 1E'-3E', wherein generating the prediction block based on the fusion of the preliminary prediction blocks comprises generating the prediction block based on prediction parameters derived from subblock sizes.

Aspect 1F'. A method of encoding or decoding video data, the method comprising: for each respective intra mode of a plurality of intra modes in a most-probable mode (MPM) list: generating, based on references samples for a template region and using the respective intra mode, prediction samples for the template region, wherein the template region is above or left of a block of the video data; determining a cost for the respective intra mode based on differences between (1) the prediction samples for the template region and (2) reconstructed samples for the template region; determining a first intra mode and a second intra mode, wherein the first intra mode and the second intra mode are intra modes in the MPM list having lowest costs; based on the second intra mode minus the cost of the first intra mode being less than the cost of the first intra mode: determining weights for the first intra mode and the second intra mode; determining preliminary prediction blocks for the first intra mode and the second intra mode; generating a prediction block based on a fusion of the preliminary prediction blocks weighted according to the weights for the first intra mode and the second intra mode; and one of reconstructing the block based on the prediction block, or encoding the block based on the prediction block.

Aspect 2F'. The method of aspect 1F', wherein generating the prediction block based on the fusion of the preliminary blocks comprises generating the prediction block based on the fusion of the preliminary blocks based on the first intra mode and the second intra mode being different.

Aspect 3F'. The method of aspects 1F'-2F', wherein determining the weights for the first intra mode and the second intra mode comprises determining the weights for the first intra mode and the second intra mode based on the cost of the first intra mode and the cost of the second intra mode.

Aspect 1G'. A device for coding video data, the device comprising one or more means for performing the method of any of aspects 1A'-3F'.

Aspect 2G'. The device of aspect 1G', wherein the one or more means comprise one or more processors implemented in circuitry.

Aspect 3G'. The device of any of aspects 1G' and 2G', further comprising a memory to store the video data.

Aspect 4G'. The device of any of aspects 1G'-3G', further comprising a display configured to display decoded video data.

Aspect 5G'. The device of any of aspects 1G'-4G', wherein the device comprises one or more of a camera, a computer, a mobile device, a broadcast receiver device, or a set-top box.

Aspect 1H'. A computer-readable storage medium having stored thereon instructions that, when executed, cause one or more processors to perform the method of any of aspects 1A'-3F'.

Aspect 1I'. The method, device, or computer-readable medium of any of aspects 1A'-1H', wherein one of reconstructing the block based on the prediction block or encoding the block based on the prediction block comprises reconstructing the block based on the prediction block.

Aspect 2I'. The method, device, or computer-readable medium of any of aspects 1A'-1H', wherein one of reconstructing the block based on the prediction block or encoding the block based on the prediction block comprises encoding the block based on the prediction block.

Example 1J: A method of encoding or decoding video data includes for each respective intra prediction mode of a plurality of intra prediction modes in a most-probable mode (MPM) list: generating, based on reference samples for a template region and using the respective intra prediction mode, prediction samples for the template region, wherein the template region is above or left of a block of the video data; and determining a cost for the respective intra prediction mode based on differences between (1) the prediction samples for the template region and (2) reconstructed samples for the template region; determining a first intra prediction mode and a second intra prediction mode, wherein the first intra prediction mode and the second intra prediction mode are intra prediction modes in the MPM list having lowest costs; determining a weight for the first intra prediction mode and a weight for the second intra prediction mode; determining a preliminary prediction block for the first intra prediction mode and a preliminary prediction block for the second intra prediction mode; generating a prediction block based on a fusion of the preliminary prediction block for the first intra prediction mode and the preliminary prediction block for the second intra prediction mode weighted according to the weight for the first intra prediction mode and the weight for the second intra prediction mode; and one of reconstructing the block based on the prediction block, or encoding the block based on the prediction block.

Example 2J: The method of example 1J, wherein generating the prediction block based on the fusion of the preliminary block for the first intra prediction mode and the preliminary prediction block for the second intra prediction mode comprises generating the prediction block based on the fusion of the preliminary block for the first intra prediction mode and the preliminary prediction block for the second intra prediction mode based on the first intra prediction mode and the second intra prediction mode being different.

Example 3J: The method of any of examples 1J and 2J, wherein: the method further comprises determining a cost of the fusion of the preliminary block for the first intra prediction mode and the preliminary prediction block for the second intra prediction mode, and generating the prediction block based on the fusion of the preliminary block for the first intra prediction mode and the preliminary prediction block for the second intra prediction mode comprises generating the prediction block based on the fusion of the preliminary block for the first intra prediction mode and the preliminary prediction block for the second intra prediction mode based on the cost of the fusion being less than a cost of any of the intra prediction modes.

Example 4J: The method of any of examples 1J through 3J, wherein generating the prediction block based on the fusion of the preliminary prediction block for the first intra prediction mode and the preliminary prediction block for the second intra prediction mode comprises generating the prediction block based on prediction parameters derived from subblock sizes.

Example 5J: The method of any of examples 1J through 4J, wherein generating the prediction block based on the fusion of the preliminary block for the first intra prediction mode and the preliminary prediction block for the second intra prediction mode comprises generating the prediction block based on a fusion of the preliminary prediction block for the first intra prediction mode and the preliminary prediction block for the second intra prediction mode weighted according to the weight for the first intra prediction mode and the weight for the second intra prediction mode based on the cost of the second intra prediction mode minus the cost of the first intra prediction mode being less than the cost of the first intra prediction mode.

Example 6J: The method of any of examples 1J through 5J, wherein determining the weight for the first intra prediction mode and the weight for the second intra prediction mode comprises determining the weight for the first intra prediction mode and the weight for the second intra prediction mode based on the cost of the first intra prediction mode and the cost of the second intra prediction mode.

Example 7J: A device for encoding or decoding video data includes a memory to store the video data; and one or more processors implemented in circuitry, the one or more processors configured to: for each respective intra prediction mode of a plurality of intra prediction modes in a most-probable mode (MPM) list: generate, based on reference samples for a template region and using the respective intra prediction mode, prediction samples for the template region, wherein the template region is above or left of a block of the video data; and determine a cost for the respective intra prediction mode based on differences between (1) the prediction samples for the template region and (2) reconstructed samples for the template region; determine a first intra prediction mode and a second intra prediction mode, wherein the first intra prediction mode and the second intra prediction mode are intra prediction modes in the MPM list having lowest costs; determine a weight for the first intra prediction mode and a weight for the second intra prediction mode; determining a preliminary prediction block for the first intra prediction mode and a preliminary prediction block for the second intra prediction mode; generate a prediction block based on a fusion of the preliminary prediction block for the first intra prediction mode and the preliminary prediction block for the second intra prediction mode weighted according to the weight for the first intra prediction mode and the weight for the second intra prediction mode; and reconstruct the block based on the prediction block, or encode the block based on the prediction block.

Example 8J: The device of example 7J, wherein the one or more processors are configured to generate the prediction block based on the fusion of the preliminary block for the first intra prediction mode and the preliminary prediction block for the second intra prediction mode based on the first intra prediction mode and the second intra prediction mode being different.

Example 9J: The device of any of examples 7J and 8J, wherein: the one or more processors are further configured to determine a cost of the fusion of the preliminary block for the first intra prediction mode and the preliminary prediction block for the second intra prediction mode, and the one or more processors are configured to generate the prediction block based on the fusion of the preliminary block for the first intra prediction mode and the preliminary prediction block for the second intra prediction mode based on the cost of the fusion being less than a cost of any of the intra prediction modes.

Example 10J: The device of any of examples 7J through 9J, wherein the one or more processors are configured to generate the prediction block based on prediction parameters derived from subblock sizes.

Example 11J: The device of any of examples 7J through 10J, wherein the one or more processors are configured to generate the prediction block based on a fusion of the preliminary prediction block for the first intra prediction mode and the preliminary prediction block for the second intra prediction mode weighted according to the weight for the first intra prediction mode and the weight for the second intra prediction mode based on the cost of the second intra prediction mode minus the cost of the first intra prediction mode being less than the cost of the first intra prediction mode.

Example 12J: The device of any of examples 7J through 11J, wherein the one or more processors are configured to determine the weight for the first intra prediction mode and the weight for the second intra prediction mode based on the cost of the first intra prediction mode and the cost of the second intra prediction mode.

Example 13J: The device of any of examples 7J through 12J, further comprising a display configured to display decoded video data.

Example 14J: The device of any of examples 7J through 13J, wherein the device comprises one or more of a camera, a computer, a mobile device, a broadcast receiver device, or a set-top box.

Example 15J: A device for encoding or decoding video data includes for each respective intra prediction mode of a plurality of intra prediction modes in a most-probable mode (MPM) list: means for generating, based on reference samples for a template region and using the respective intra prediction mode, prediction samples for the template region, wherein the template region is above or left of a block of the video data; and means for determining a cost for the respective intra prediction mode based on differences between (1) the prediction samples for the template region and (2) reconstructed samples for the template region; means for determining a first intra prediction mode and a second intra prediction mode, wherein the first intra prediction mode and the second intra prediction mode are intra prediction modes in the MPM list having lowest costs; means for determining a weight for the first intra prediction mode and a weight for the second intra prediction mode; means for determining a preliminary prediction block for the first intra prediction mode and a preliminary prediction block for the second intra prediction mode; means for generating a prediction block based on a fusion of the preliminary prediction block for the first intra prediction mode and the preliminary prediction block for the second intra prediction mode weighted according to the weight for the first intra prediction mode and the weight for the second intra prediction mode; and means for reconstructing the block based on the prediction block or means for encoding the block based on the prediction block.

Example 16J: The device of example 15J, wherein the means for generating the prediction block based on the fusion of the preliminary blocks comprises means for generating the prediction block based on the fusion of the preliminary blocks based on the first intra prediction mode and the second intra prediction mode being different.

Example 17J: The device of any of examples 15J and 16J, wherein: the device further comprises means for determining a cost of the fusion of the preliminary blocks, and the means for generating the prediction block based on the fusion of the preliminary blocks comprises means for generating the prediction block based on the fusion of the preliminary blocks based on the cost of the fusion being less than a cost of any of the intra prediction modes.

Example 18J: The device of any of examples 15J through 17J, wherein the means for generating the prediction block based on the fusion of the preliminary prediction blocks comprises means for generating the prediction block based on prediction parameters derived from subblock sizes.

Example 19J: The device of any of examples 15J through 18J, wherein the means for generating the prediction block based on the fusion of the preliminary blocks comprises means for generating the prediction block based on a fusion of the preliminary prediction blocks weighted according to the weights for the first intra prediction mode and the second intra prediction mode based on the cost of the second intra prediction mode minus the cost of the first intra prediction mode being less than the cost of the first intra prediction mode.

Example 20J: A non-transitory computer-readable storage medium having stored thereon instructions that, when executed, cause one or more processors to: for each respective intra prediction mode of a plurality of intra prediction modes in a most-probable mode (MPM) list: generate, based on reference samples for a template region and using the respective intra prediction mode, prediction samples for the template region, wherein the template region is above or left of a block of video data; and determine a cost for the respective intra prediction mode based on differences between (1) the prediction samples for the template region and (2) reconstructed samples for the template region; determine a first intra prediction mode and a second intra prediction mode, wherein the first intra prediction mode and the second intra prediction mode are intra prediction modes in the MPM list having lowest costs; determine a weight for the first intra prediction mode and a weight for the second intra prediction mode; determine a preliminary prediction block for the first intra prediction mode and a preliminary prediction block for the second intra prediction mode; generate a prediction block based on a fusion of the preliminary prediction block for the first intra prediction mode and the preliminary prediction block for the second intra prediction mode weighted according to the weight for the first intra prediction mode and the weight for the second intra prediction mode; and reconstruct the block based on the prediction block or encode the block based on the prediction block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:
   for each respective intra prediction mode of a plurality of intra prediction modes in a most-probable mode (MPM) list:
      generating, based on reference samples for a template region and using the respective intra prediction mode, prediction samples for the template region, wherein the template region is above or left of a block of the video data; and
      determining a respective cost for the respective intra prediction mode based on differences between (1) the prediction samples for the template region and (2) reconstructed samples for the template region;
   determining a first intra prediction mode in the MPM list and a second intra prediction mode in the MPM list, wherein the first intra prediction mode and the second intra prediction mode are intra prediction modes in the MPM list having lowest determined respective costs, the lowest determined respective costs including a first determined cost for the first intra prediction mode and a second determined cost for the second intra prediction mode;
   determining a weight for the first intra prediction mode based on the first determined cost for the first intra prediction mode and a weight for the second intra prediction mode based on the second determined cost for the second intra prediction mode;
   determining a preliminary prediction block for the first intra prediction mode and a preliminary prediction block for the second intra prediction mode;
   generating a prediction block based on a fusion of the preliminary prediction block for the first intra prediction mode and the preliminary prediction block for the second intra prediction mode weighted according to the weight for the first intra prediction mode and the weight for the second intra prediction mode; and
   one of reconstructing the block based on the prediction block, or encoding the block based on the prediction block.

2. The method of claim 1, wherein generating the prediction block based on the fusion of the preliminary block for the first intra prediction mode and the preliminary prediction block for the second intra prediction mode comprises generating the prediction block based on the fusion of the preliminary block for the first intra prediction mode and the preliminary prediction block for the second intra prediction mode based on the first intra prediction mode and the second intra prediction mode being different.

3. The method of claim 1, wherein:
   the method further comprises determining a cost of the fusion of the preliminary block for the first intra prediction mode and the preliminary prediction block for the second intra prediction mode, and
   generating the prediction block based on the fusion of the preliminary block for the first intra prediction mode and the preliminary prediction block for the second intra prediction mode comprises generating the prediction block based on the fusion of the preliminary block for the first intra prediction mode and the preliminary prediction block for the second intra prediction mode based on the cost of the fusion being less than a cost of any of the intra prediction modes.

4. The method of claim 1, wherein generating the prediction block based on the fusion of the preliminary prediction block for the first intra prediction mode and the preliminary prediction block for the second intra prediction mode comprises generating the prediction block based on prediction parameters derived from subblock sizes.

5. The method of claim 1, wherein generating the prediction block based on the fusion of the preliminary block for the first intra prediction mode and the preliminary prediction block for the second intra prediction mode comprises generating the prediction block based on a fusion of the preliminary prediction block for the first intra prediction mode and the preliminary prediction block for the second intra prediction mode weighted according to the weight for the first intra prediction mode and the weight for the second intra prediction mode based on the cost of the second intra prediction mode minus the cost of the first intra prediction mode being less than the cost of the first intra prediction mode.

6. A device for encoding or decoding video data, the device comprising:
   a memory to store the video data; and
   one or more processors implemented in circuitry, the one or more processors configured to:

for each respective intra prediction mode of a plurality of intra prediction modes in a most-probable mode (MPM) list:
  generate, based on reference samples for a template region and using the respective intra prediction mode, prediction samples for the template region, wherein the template region is above or left of a block of the video data; and
  determine a respective cost for the respective intra prediction mode based on differences between (1) the prediction samples for the template region and (2) reconstructed samples for the template region;
determine a first intra prediction mode in the MPM list and a second intra prediction mode in the MPM list, wherein the first intra prediction mode and the second intra prediction mode are intra prediction modes in the MPM list having lowest determined respective costs, the lowest determined respective costs including a first determined cost for the first intra prediction mode and a second determined cost for the second intra prediction mode;
determine a weight for the first intra prediction mode based on the first determined cost for the first intra prediction mode and a weight for the second intra prediction mode based on the second determined cost for the second intra prediction mode;
determine a preliminary prediction block for the first intra prediction mode and a preliminary prediction block for the second intra prediction mode;
generate a prediction block based on a fusion of the preliminary prediction block for the first intra prediction mode and the preliminary prediction block for the second intra prediction mode weighted according to the weight for the first intra prediction mode and the weight for the second intra prediction mode; and
reconstruct the block based on the prediction block, or encode the block based on the prediction block.

7. The device of claim 6, wherein the one or more processors are configured to generate the prediction block based on the fusion of the preliminary block for the first intra prediction mode and the preliminary prediction block for the second intra prediction mode based on the first intra prediction mode and the second intra prediction mode being different.

8. The device of claim 6, wherein:
the one or more processors are further configured to determine a cost of the fusion of the preliminary block for the first intra prediction mode and the preliminary prediction block for the second intra prediction mode, and
the one or more processors are configured to generate the prediction block based on the fusion of the preliminary block for the first intra prediction mode and the preliminary prediction block for the second intra prediction mode based on the cost of the fusion being less than a cost of any of the intra prediction modes.

9. The device of claim 6, wherein the one or more processors are configured to generate the prediction block based on prediction parameters derived from subblock sizes.

10. The device of claim 6, wherein the one or more processors are configured to generate the prediction block based on a fusion of the preliminary prediction block for the first intra prediction mode and the preliminary prediction block for the second intra prediction mode weighted according to the weight for the first intra prediction mode and the weight for the second intra prediction mode based on the cost of the second intra prediction mode minus the cost of the first intra prediction mode being less than the cost of the first intra prediction mode.

11. The device of claim 6, further comprising a display configured to display decoded video data.

12. The device of claim 6, wherein the device comprises one or more of a camera, a computer, a mobile device, a broadcast receiver device, or a set-top box.

13. A device for encoding or decoding video data, the device comprising:
for each respective intra prediction mode of a plurality of intra prediction modes in a most-probable mode (MPM) list:
  means for generating, based on reference samples for a template region and using the respective intra prediction mode, prediction samples for the template region, wherein the template region is above or left of a block of the video data; and
  means for determining a respective cost for the respective intra prediction mode based on differences between (1) the prediction samples for the template region and (2) reconstructed samples for the template region;
means for determining a first intra prediction mode in the MPM list and a second intra prediction mode in the MPM list, wherein the first intra prediction mode and the second intra prediction mode are intra prediction modes in the MPM list having lowest determined respective costs, the lowest determined respective costs including a first determined cost for the first intra prediction mode and a second determined cost for the second intra prediction mode;
means for determining a weight for the first intra prediction mode based on the first determined cost for the first intra prediction mode and a weight for the second intra prediction mode based on the second determined cost for the second intra prediction mode;
means for determining a preliminary prediction block for the first intra prediction mode and a preliminary prediction block for the second intra prediction mode;
means for generating a prediction block based on a fusion of the preliminary prediction block for the first intra prediction mode and the preliminary prediction block for the second intra prediction mode weighted according to the weight for the first intra prediction mode and the weight for the second intra prediction mode; and
means for reconstructing the block based on the prediction block or means for encoding the block based on the prediction block.

14. The device of claim 13, wherein the means for generating the prediction block based on the fusion of the preliminary blocks comprises means for generating the prediction block based on the fusion of the preliminary blocks based on the first intra prediction mode and the second intra prediction mode being different.

15. The device of claim 13, wherein:
the device further comprises means for determining a cost of the fusion of the preliminary blocks, and
the means for generating the prediction block based on the fusion of the preliminary blocks comprises means for generating the prediction block based on the fusion of the preliminary blocks based on the cost of the fusion being less than a cost of any of the intra prediction modes.

16. The device of claim 13, wherein the means for generating the prediction block based on the fusion of the preliminary prediction blocks comprises means for generating the prediction block based on prediction parameters derived from subblock sizes.

* * * * *